(12) United States Patent
Shinohara et al.

(10) Patent No.: US 9,926,694 B2
(45) Date of Patent: Mar. 27, 2018

(54) OPERATING DEVICE FOR FLUSH WATER TANK ASSEMBLY, FLUSH WATER TANK ASSEMBLY, AND FLUSH TOILET

(71) Applicant: TOTO LTD., Kitakyushu-shi, Fukuoka (JP)

(72) Inventors: Koki Shinohara, Kitakyushu (JP); Hideki Tanimoto, Kitakyushu (JP); Kenji Hatama, Kitakyushu (JP); Makoto Abe, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/233,530

(22) Filed: Aug. 10, 2016

(65) Prior Publication Data

US 2017/0051485 A1 Feb. 23, 2017

(30) Foreign Application Priority Data

Aug. 20, 2015 (JP) .................................. 2015-163068
Mar. 14, 2016 (JP) .................................. 2016-050110

(51) Int. Cl.
*E03D 5/094* (2006.01)
*E03D 1/00* (2006.01)
*E03D 1/14* (2006.01)

(52) U.S. Cl.
CPC ............... *E03D 5/094* (2013.01); *E03D 1/00* (2013.01); *E03D 1/14* (2013.01)

(58) Field of Classification Search
CPC ............. E03D 1/00; E03D 1/094; E03D 1/14

USPC ...................................... 4/249, 324, 405–414
See application file for complete search history.

(56) References Cited

U.S. PATENT DOCUMENTS

| 2,548,658 | A  | * | 4/1951 | Duncan ................... | E03D 5/092 |
|           |    |   |        |                          | 4/414 |
| 8,418,276 | B2 | * | 4/2013 | Huang ...................... | E03D 5/02 |
|           |    |   |        |                          | 4/405 |
| 9,340,962 | B2 | * | 5/2016 | Tanimoto ................ | E03D 5/094 |
| 2013/0219606 | A1 | * | 8/2013 | Lambert ................... | E03D 5/02 |
|           |    |   |        |                          | 4/324 |

FOREIGN PATENT DOCUMENTS

JP        2014-190131 A       10/2014

* cited by examiner

*Primary Examiner* — Tuan N Nguyen
*Assistant Examiner* — William R Klotz
(74) *Attorney, Agent, or Firm* — Baker & Hostetler LLP

(57) ABSTRACT

An operating device for a flush water tank assembly includes: a rotary shaft, an operating handle, an operating wire, and a drive unit, wherein the drive unit includes: a rotary member, a rotary winding member, a locking unit for mutually locking the rotary member and the rotary winding member when the rotary winding member rotates in a forward rotational direction from operating position P1 and reaches operating position P3, and a lock release portion for releasing the lock between the rotary member and the rotary winding member when the rotary member and the rotary winding member rotate in a forward rotational direction from operating position P1 and reach operating position P3.

12 Claims, 20 Drawing Sheets

OPERATING DEVICE FOR FLUSH WATER TANK ASSEMBLY, FLUSH WATER TANK ASSEMBLY, AND FLUSH TOILET

BACKGROUND OF THE INVENTION

Field of the Invention

The present invention relates to an operating device for a flush water tank assembly, a flush water tank assembly, and a flush toilet, and more particularly to an operating device for a flush water tank assembly, which starts the supply of flush water to a toilet by opening a discharge valve on a reservoir tank supplying flush water to a toilet, a flush water tank assembly, and a flush toilet.

Description of Related Art

For some time, known operating devices for a flush water tank assembly, for operating a discharge valve of the flush water tank assembly to supply flush water to a toilet have included those in which, as in Patent Document 1 (Japanese Patent Unexamined Publication No. 2014-190131), for example, for a discharge valve apparatus for opening and closing a discharge valve on a flush water tank by up and down movement (a "direct-type discharge valve apparatus"), the amount of movement of the discharge valve main body in the up-down direction is controlled by controlling the amount of movement of an operating wire, such as the amount of lifting of an operating wire linked to the discharge valve main body (or the winding amount by which an operating wire is wound up).

Conventional operating devices for a flush water tank assembly such as that set forth in Patent Document 1 include an operating member such as an operating handle or the like which can be rotated by a user, and a pulley for winding up an operating wire in tandem with the rotation of this operating member. The operating member and pulley are in a mutually constantly linked state regardless of functional state, and the flush water amount supplied from the flush water tank assembly to the toilet is determined in response to the elapsed time from the start of the opening of the discharge valve by the rotation of the operating member and pulley at initial position winding up the operating wire, up to the closing of the valve when the discharge valve body drops together with the water level inside the flush water tank, i.e., the operating time (operating member operating time) from start to completion of operation of the operating member. Hence, for example, the longer the time over which the operating handle and pulley rotation state is maintained, the operating wire wound-up state is maintained, and the discharge valve lifted state is maintained, the longer is the operating member operating time or the discharge valve main body valve opening time, thereby increasing the amount of flush water supplied from the flush water tank to the toilet.

On the other hand, while the amount of flush water usable for toilet flushing has been decreased to a regulation amount of approximately 3.8 L, for example, in conjunction with the conservation of flush toilet water in recent years, valve opening time can, depending on the length of the operating member operating time, become longer than the discharge valve opening time during which flushing can be effected using a flush water amount within regulation amount, causing the problem that toilet flushing using a flush water amount controlled to be within a regulation amount is difficult. Another problem is that in the above-described conventional operating device for the flush water tank assembly in which the operating member and pulley are mutually constantly linked irrespective of functional state, there is a limit on the extent to which the operating member operating time can be shortened, and operability and ease of use are compromised.

SUMMARY OF THE INVENTION

The present invention was therefore undertaken to solve the above-described problems with the conventional art, and has the object of providing an operating device for a flush water tank assembly enabling toilet flushing controlled to a regulated amount of flush water supplied to the toilet, so that toilet flush water can be conserved.

To accomplish the object above, the present invention is an operating device for a flush water tank assembly, for operating a discharge valve of the flush water tank assembly to supply flush water to a toilet, the operating device comprising:

a rotary shaft extending so as to penetrate a wall of a flush water tank of the flush water tank assembly;

an operating member for rotating the rotary shaft, the operating member being attached to the outside portion of the rotary shaft, the outside portion of the rotary shaft being positioned on an outside of the flush water tank;

a linking member having one end which is linked to the discharge valve of the flush water tank assembly; and a drive unit for moving the linking member from a first operating position to a second operating position by a rotation of the operating member, the drive unit being positioned on the inside of the flush water tank and being attached to the rotary shaft, wherein the first operating position corresponds to a position at which the discharge valve is closed, and the second operating position corresponds to a position at which the discharge valve is open;

wherein the drive unit includes:

a rotary member affixed to the rotary shaft and integrally rotating with the rotary shaft;

a rotary winding member to which other end of the linking member is linked, wherein when the rotary shaft and the rotary member rotate so as to open the discharge valve, the rotary member engages with the rotary winding member, and the rotary winding member rotates and winds the linking member such that the linking member is moved from the first operating position to the second operating position;

a locking unit for engaging with the rotary member when the rotary winding member rotates from the first operating position to the second operating position;

a lock release portion, wherein when the rotary member and the rotary winding member rotate such that the linking member moves to the second operating position, a lock between the rotary member and the rotary winding member is released, and the rotary winding member rotates in a valve closing direction in which the discharge valve is closed such that the linking member reaches the first operating position; and a housing for housing at least the rotary member and the rotary winding member.

According to the invention thus constituted, when the supply of flush water to the toilet is started by the operation of opening the discharge valve on the flush water tank assembly supplying flush water to the float, rotation of the operating member from the first operating position corresponding to the closed discharge valve position to the second operating position corresponding to the fully open discharge valve position results in the rotary shaft rotating, together with the operating member, in the valve opening direction, thereby opening the discharge valve, and in the integral rotation of the drive unit together which this rotary shaft, from the first operating position to the second operating position. At this point, because the drive unit rotary winding member is locked to the rotary member by the locking unit, the rotary winding member also rotates together with the rotary member from the first operating position in a predetermined valve opening direction to the second operating position, therefore the discharge valve moves from the closed valve position in the valve opening direction due to the winding up by the rotary winding member of the linking member linking the discharge valve and the drive unit rotary winding member, and flush water is thus supplied from the flush water tank to the toilet. When the rotary member and the rotary winding member respectively rotate from the first operating position in a predetermined valve opening direction and have rotated to the second operating position, and the linking member linking the discharge valve and the drive unit rotary winding member is wound up by a predetermined amount by the rotary winding member, the discharge valve is moved from the closed valve position to the fully open valve position by the predetermined amount of this wound up linking member, while at the same time the lock release portion releases the lock between the rotary member and the rotary winding member, and the rotary winding member moves in a predetermined valve closing direction, opposite the valve opening direction, to the first operating position, irrespective of operating member operation. In other words, when the discharge valve opening operation is started and the discharge valve moves temporarily to the fully open position, irrespective of the operating member operation, at least the rotary winding member and the linking member can rapidly move to the first operating position and close the discharge valve, thereby enabling toilet flushing in which the flush water amount supplied with each flush from the flush water tank to the toilet is controlled to a regulation amount. Also, because the time from the start of the discharge valve opening operation (the discharge valve opening time) can be shortened by the lock release portion, the regulation flush water amount required for toilet flushing can be set relatively low, and toilet flush water can be conserved.

In the present invention, preferably, the locking unit includes:

a biasing member having one end that is attached to at least one of the rotary member and the rotary winding member, and a locking member disposed at other end of the biasing member, the locking member engaging with the rotary member and the rotary winding member due to a biasing force of the biasing member, thereby locking the rotary winding member and the rotary member when the rotary member and the rotary winding member rotate such that the linking member moves to the second operating position from the first operation position;

wherein the lock release portion is disposed on the housing, and when the rotary winding member rotates such that the linking member moves to the second operating position from the first operating position, the locking member engages with the lock release portion of the housing so that the lock between the rotary winding member and the rotary member can be released.

According to the invention thus constituted, after the discharge valve opening operation is started by rotation of the operating member, the locking unit locking member engages with both the rotary member and the rotary winding member due to the biasing force of the biasing member when the rotary member and the rotary winding member respectively have rotated from the first operating position to the second operating position, and the rotary winding member and the rotary member are locked. Therefore the rotary winding member, together with the rotary member, has rotated from the first operating position to the second operating position, and the linking member is wound up by the rotary winding member so that the discharge valve moves from the closed valve position to the open valve position, and flush water is supplied from the flush water tank to the toilet. When the rotary member and the rotary winding member respectively have rotated from the first operating position to the second operating position, the discharge valve is moved from the closed valve position to the fully open valve position by the predetermined amount of this wound up linking member, while at the same time the locking unit locking member engages with the lock release portion mounted in the drive unit housing, resulting in release of the lock between the rotary member and the rotary winding member, so that regardless of operating member operation, the rotary winding member moves in a predetermined valve closing direction, opposite the valve opening direction, to the first operating position. In other words, when the discharge valve opening operation is started and the discharge valve moves temporarily to the fully open position, irrespective of the operating member operation, at least the rotary winding member can rapidly move to the first operating position and close the discharge valve, thereby enabling toilet flushing in which the flush water amount supplied with each flush from the flush water tank to the toilet is controlled to a regulation amount. Also, because the time from the start of the discharge valve opening operation (the discharge valve opening time) can be shortened by the lock release portion, the regulation flush water amount required for toilet flushing can be set relatively low, and toilet flush water can be conserved.

In the present invention, preferably, the biasing member has one end that is attached to the rotary winding member, and the locking member projects from the rotary winding member under the biasing force of the biasing member and engages with the rotary member until the linking member reaches the second operating position from the first operating position, and the locking member is attached to the other end of the biasing member such that the locking member can engage with the rotary member;

wherein the locking unit further includes a locking projecting portion disposed to project from the rotary member, wherein the locking projecting portion of the rotary member engages with a portion of the locking member without engaging with the lock release portion of the housing until the linking member reaches the second operating position from the first operating position; and wherein in a state in which the linking member has reached the second operating position from the first operating position, the locking projecting portion of the rotary member, and the locking member engaging with the lock release portion of the housing are separated from one another.

According to the invention thus constituted, from the time the rotary member and the rotary winding member respectively have rotated from the first operating position to the second operating position, the projecting portion for locking the rotary member engages with a portion of the linking member projecting from the rotary winding member without the projecting portion for locking the rotary member engaging with the lock release portion, therefore the rotary member and the rotary winding member are locked together. Also, in a state whereby the rotary member and the rotary winding member respectively have rotated from the first operating position to the second operating position, the engaging of a part of the locking member to the lock release portion results in the locking member, which had projected from the rotary winding member and been engaged with the rotary member locking projecting portion, being pressed in opposition to the biasing force of the biasing member by the lock release portion, so that the engagement with the rotary member locking projecting portion is released, therefore the lock between the rotary member and the rotary winding member is released. At this point the engaging part of the linking member engaged with the rotary member locking projecting portion and the engaging part of the linking member for engaging with the lock release portion are set to be mutually separated, and the rotary member locking projecting portion and the housing lock release portion can be prevented from mutually colliding, therefore the mutually locked rotary member and rotary winding member can be quickly moved so that their locking is mutually released at the point they have rotated to the second operating position. Also, even in a state in which the operating member is operated at the second operating position, or the operating member is further rotated in a predetermined valve opening direction from the second operating position, the rotary winding member is already moved from the second operating position in a predetermined valve opening direction to the first operating position without the rotary member locking projecting portion colliding with the housing lock release portion, and a state can be maintained in which the rotary member locking projecting portion passes over the linking member and engaging is released, therefore the discharge valve can be prevented from being unintentionally released. This enables toilet flushing in which the flush water amount supplied with each flush from the flush water tank to the toilet is controlled to a regulation amount.

In the present invention, preferably, the lock release portion is a lock releasing projecting portion placed inside the housing, and wherein the locking member has a sloped surface, the sloped surface engaging with the lock releasing projecting portion when the linking member has reached the second operating position from the first operating position.

According to the invention thus constituted, the lock release portion is a lock release projecting portion disposed on the inside of the housing, and since the surface on the front side in the predetermined valve opening direction of the locking member engaged with the lock release projecting portion forms a sloped surface when the rotary winding member has rotated from the first operating position to the second operating position, it becomes easier when the rotary member and rotary winding member have respectively rotated from the first operating position to the second operating position for the sloped surface formed in the forward surface in the predetermined valve opening direction of the locking member to engage with the housing lock release projecting portion. Therefore because the locking member, which had been engaged with the rotary member locking projecting portion projecting out from the rotary winding member, becomes more easily pressed in opposition to the biasing force of the biasing member by the housing lock release projecting portion, locking between the locking member and the rotary member locking projecting portion can also be more easily released. Hence the rotary member and the rotary winding member can, upon reaching the second operating position, be quickly moved from a mutually locked state to a mutually unlocked state. This enables toilet flushing in which the flush water amount supplied with each flush from the flush water tank to the toilet is controlled to a regulation amount.

In the present invention, preferably, the lock releasing projecting portion of the housing has a sloped surface, the sloped surface of the lock releasing projecting portion engaging with the sloped surface of the locking member when the linking member has reached to the second operating position.

According to the invention thus constituted, when the rotary winding member has rotated to the second operating position, the part engaged with the sloped surface of the locking member in the housing lock release projecting portion forms a sloped surface, therefore when the rotary member and the rotary winding member respectively have rotated from the first operating position to the second operating position, the sloped surface formed on the front surface in the predetermined valve opening direction of the locking member more easily engages with the sloped surface of the housing locking projecting portion. Since the locking member, which had been engaged with the rotary member locking projecting portion projecting out from the rotary winding member, becomes more easily pressed in opposition to the biasing force of the biasing member by the sloped surface of the housing lock release projecting portion, locking between the locking member and the rotary member locking projecting portion can also be even more easily released. Hence the rotary member and the rotary winding member can, upon reaching the second operating position, be more quickly moved from a mutually locked state to a mutually unlocked state. This enables toilet flushing in which the flush water amount supplied with each flush from the flush water tank to the toilet is controlled to a regulation amount.

In the present invention, preferably, the locking projecting portion of the rotary member has a sloped surface, the sloped surface being configured such that when the linking member has returned to the first operating position after the lock between the rotary member and the rotary winding member has been released when the linking member has reached the second operating position, the sloped surface of the locking member being able to pass over the sloped surface on the locking projecting portion of the rotary member.

According to the invention thus constituted, when the rotary member has returned to the first operating position after the lock between the rotary member and the rotary winding member has been released at the second operating position and the rotary winding member has returned to the first operating position, the rear surface on the rotary member locking projecting portion opposite the sloped surface of the locking member sloped surface itself forms a sloped surface so that the rotary member locking projecting portion is able to pass over at the rear side of the locking member, therefore when the rotary member is returned to the first operating position by operation of the operating member, the sloped surface on the rear side of the rotary member locking projecting portion engages with the locking member sloped surface and presses against the biasing force of the biasing member, so that the rotary member locking projecting portion is able to quickly pass over the rear side of the locking member. In the passed-over state, the locking member again projects out from the rotary winding member under the biasing force of the biasing member and quickly engages with the rotary member locking projecting portion, so the rotary member and the rotary winding member can again be locked at the first operating position. Preparation for starting the next toilet flushing can therefore be quickly and reliably performed, and the next toilet flushing can also be carried out with the flush water supplied from the flush water tank to the toilet reliably controlled to the regulated amount.

In the present invention, preferably, the drive unit further includes a rotary winding member biasing portion for biasing the rotary winding member such that the linking member moves to the first operating position after the linking member has reached the second operating position.

According to the invention thus constituted, when the rotary winding member has rotated to the second operating position, the drive unit is equipped with a rotary winding member biasing portion for biasing the rotary winding member so as to move it to a first operating position, with the result that when the discharge valve opening operation is started and the rotary winding member has rotated from the first operating position to the second operating position, the lock between the rotary member and the rotary winding member is released and the rotary winding member and linking member move to the first operating position, whereupon the biasing force from the drive unit rotary winding member biasing member enables the rotary winding member and the linking member to move more quickly and reliably to the first operating position even if there is sliding resistance or the like in these members, and the discharge valve can be more quickly and reliably closed. This enables toilet flushing in which the flush water amount supplied with each flush from the flush water tank to the toilet is controlled to a regulation amount. Also, after the rotary winding member has rotated to the second operating position, the rotary winding member can, in preparation for the next discharge valve opening operation using the biasing force from the drive unit rotary winding member biasing portion, be quickly and reliably restored to the initial position at which the discharge valve can be closed.

In the present invention, preferably, the operating member is disposed on left side of the flush water tank or right side of the flush water tank, and when supply of flush water to the toilet is started, the implementation of a rotating operation lifting up from a first operating position to a second operating position enables a rotation operation in the valve opening direction, opening up the discharge valve, and wherein the rotary member and rotary winding member can, by a rotary operation of the operating member, be rotated in the same valve opening direction with each other such that the linking member moves from the first operating position to the second operating position; and wherein when the rotary winding member has rotated such that the linking member reaches the second operating position, the lock release between the rotary member and the rotary winding member by the lock release portion enables the rotary winding member to rotate in a valve closing direction and the linking member to move to the first operating position.

According to the invention thus constituted, when starting the supply of flush water to the toilet, a rotary operation lifting the operating member from a first operating position to a second operating position causes the rotary member and the rotary winding member to respectively rotate from the first operating position to the second operating position in the same predetermined valve opening direction, following which the rotary winding member, upon reaching the second operating position, due to the release of the lock between the rotary member and the rotary winding member by the lock release portion, is able to rotate in a predetermined valve opening direction and move to the first operating position irrespective of operating member operation. I.e., when the discharge valve opening operation is started and the discharge valve temporarily moves to the fully open position, irrespective of the operating member operation, at least the rotary winding member and the linking member can rapidly move to the first operating position and close the discharge valve, thereby enabling toilet flushing in which the flush water amount supplied with each flush from the flush water tank to the toilet is controlled to a regulation amount. Also, because the time from the start of the discharge valve opening operation (the discharge valve opening time) can be shortened, the regulation flush water amount required for toilet flushing can be set relatively low, and toilet flush water can be conserved.

In the present invention, preferably, the rotary member of the drive unit includes a drive-side rotary member affixed to the rotary shaft, and a slave-side rotary member interposed between the drive-side rotary member and the rotary winding member;

wherein the operating member is disposed on left side of the flush water tank or right side of the flush water tank, and pressing downward an operating handle of the operating member enables the operating member to rotate in a direction in which the discharge valve is opened such that the linking member moves from the first operating position to the second operating position, thereby supplying flush water to the toilet;

wherein a rotary operation of the operating member in the valve opening direction enables the drive-side rotary member and the slave-side rotary member to rotate in a first predetermined direction and a second predetermined direction, respectively such that the linking member moves from the first operating position to the second operating position;

wherein the rotary operation of the operating member in the valve opening direction enables the rotary winding member to rotate in a third predetermined direction opposite the first predetermined direction of the drive-side rotary member and wherein, when the rotary operation of the operating member in the valve opening direction enables the rotary winding member to rotate such that the linking member reaches the second operating position, the rotary winding member can, by releasing the lock between the rotary member and the rotary winding member using the lock release portion, rotate in a predetermined direction opposite the third predetermined direction such that the linking member moves to the first operating position.

According to the invention thus constituted, performing a rotary operation to press the operating member from a first operating position to a second operating position when starting the supply of flush water to the toilet results in the rotation of the drive-side rotary member and slave-side rotary member from the first operating position to the second operating position in a first predetermined valve opening direction and a second predetermined valve opening direction, respectively, and in the rotation of the rotary winding member in a third predetermined valve opening direction opposite the first predetermined valve opening direction of the drive-side rotary member, from the first operating position to the second operating position. Thereafter upon the second operating position, the rotary winding member, due to the release of the lock between the rotary member and the rotary winding member by the lock release portion, can, irrespective of operation of the operating member, be rotated in a predetermined valve closing direction, opposite a third predetermined valve opening direction, and moved to the first operating position. I.e., when the discharge valve opening operation is started and the discharge valve moves temporarily to the fully open position, irrespective of the operating member operation, at least the rotary winding member and the linking member can rapidly move to the first operating position and close the discharge valve, thereby enabling toilet flushing in which the flush water amount supplied with each flush from the flush water tank to the toilet is controlled to a regulation amount. Also, because the time from the start of the discharge valve opening operation (the discharge valve opening time) can be shortened, the regulation flush water amount required for toilet flushing can be set relatively low, and toilet flush water can be conserved.

In the present invention, preferably, the slave-side rotary member consists of multiple slave-side rotary members, and wherein the drive unit further includes a biasing member for biasing the slave-side rotary members, and after the rotary winding member has rotated such that the linking member has reached the second operating position, the biasing member biases at least one of the multiple slave-side rotary members, the at least one of the multiple slave-side rotary members enabling the operating handle of the operating member to move from a position which corresponds to the second operating position to an initial position at which the discharge valve opening operation can be started.

According to the invention thus constituted, when the rotary member moves to the first operating position after the rotary winding member has rotated to the second operating position, the discharge valve opening operation is started by the drive unit slave-side rotary member biasing portion for biasing at least one of the multiple slave-side rotary members so as to restore the member from the second operating position to the initial position at which the discharge valve opening operation can be started; the rotary member has rotated from the first operating position to the second operating position; thereafter when the lock between the rotary member and the rotary winding member is released and the rotary winding member and the rotary member move to the first operating position, as a result of the biasing force of the drive unit slave-side rotary member biasing force, at least one slave-side rotary member out of the multiple slave-side rotary members can also be quickly and reliably restored to an initial position at which the discharge valve opening operation can be started, in preparation for the next discharge valve opening operation.

The present invention is a flush water tank assembly comprising the operating device.

According to the invention thus constituted, the flush water tank assembly can be provided whereby toilet flushing in which the flush water amount supplied with each flush from the flush water tank to the toilet is controlled to a regulation amount.

Furthermore, the present invention is a flush toilet comprising the above flush water tank assembly.

According to the invention thus constituted provides a flush toilet whereby toilet flushing in which the flush water amount supplied with each flush from the flush water tank to the toilet is controlled to a regulation amount.

According to the operating device for the flush water tank assembly of the invention, toilet flushing is enabled in which the flush water amount supplied to the toilet is controlled to a regulation amount, and toilet flush water can be conserved.

DETAILED DESCRIPTION OF THE INVENTION

Below, referring to the attached figures, an operating device for a flush water tank assembly, a flush water tank assembly comprising this operating device, and a flush toilet comprising this flush water tank assembly, according to a first embodiment of the invention are described.

Figure 1:
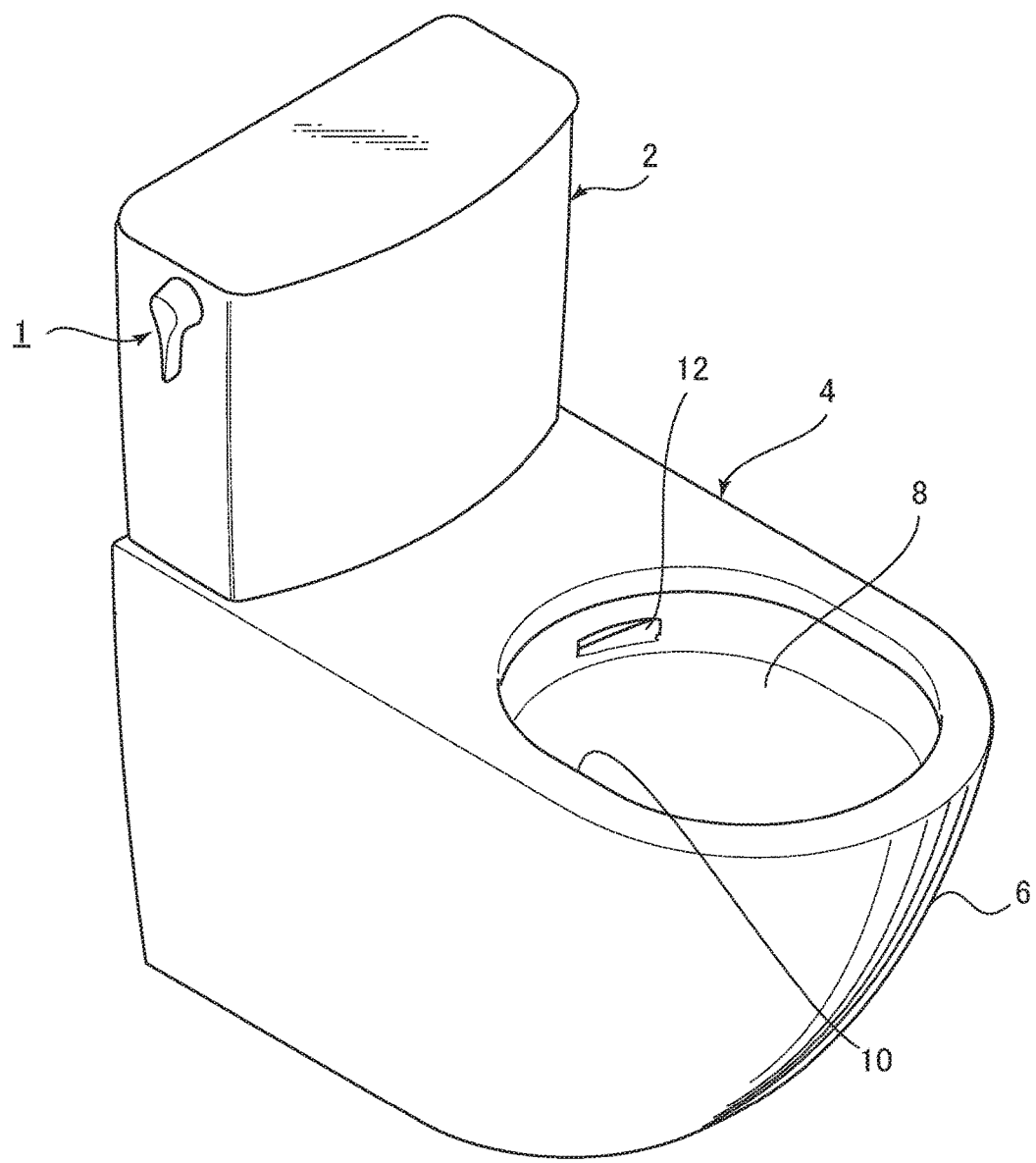
FIG. 1 is a perspective view showing the state whereby the toilet seat and toilet lid are removed, in a flush toilet to which a flush water tank assembly comprising an operating device for a flush water tank assembly according to a first embodiment of the invention is applied.

First, using FIG. 1, a flush toilet is described, to which a flush water tank assembly comprising the operating device for the flush water tank assembly according to the first embodiment of the invention is applied.

FIG. 1 is a perspective view showing the state whereby the toilet seat and toilet lid are removed, in the flush toilet to which the flush water tank assembly comprising the operating device for the flush water tank assembly according to the first embodiment of the invention is applied.

As shown in FIG. 1, an operating device 1 for the flush water tank assembly according to a first embodiment of the invention is disposed on a flush water tank assembly 2 in which flush water for toilet flushing is held, and performs the operation when flush water is supplied from this flush water tank assembly 2 to the flush toilet 4 and toilet flushing is started.

First, the flush water tank assembly 2 provided with the operating device 1 is applied to the flush toilet 4, being a water conserving siphon flush toilet for flushing with, for example, 3.8 liters to 5.2 liters of flush water, and comprising a ceramic toilet main unit 6. A bowl portion 8 and a trap conduit (not shown) communicating with the bottom portion of this bowl portion 8 are respectively formed on this toilet main unit 6.

Formed on the top edge portion of this toilet main unit 6 bowl portion 8 are an inwardly overhanging rim 10 and a spout port 12 for spouting flush water supplied from a conduit (not shown) formed internally on the rear side of the toilet main unit 6; flush water spouted from this spout port 12 descends and flushes the bowl portion 8 as it circulates.

In addition, the flush water tank assembly 2 for holding flush water supplied to the toilet main unit 2 is provided on the top surface at the rear side of the toilet main unit 6.

Note that in the present embodiment an example is explained, in which the flush water tank assembly 2 was applied to what is known as a siphon-type flush toilet 4, in which the siphon effect is used to suction in waste in the bowl portion 8 and discharge it to the outside all at once from a discharge trap pipe (not shown), but the invention is not limited to such siphon-type flush toilets, and may also be applied to other types of toilets, such as those referred to as wash-down type toilets in which waste is discharged using the flow effect caused by a water drop inside the bowl portion.

Figure 2:
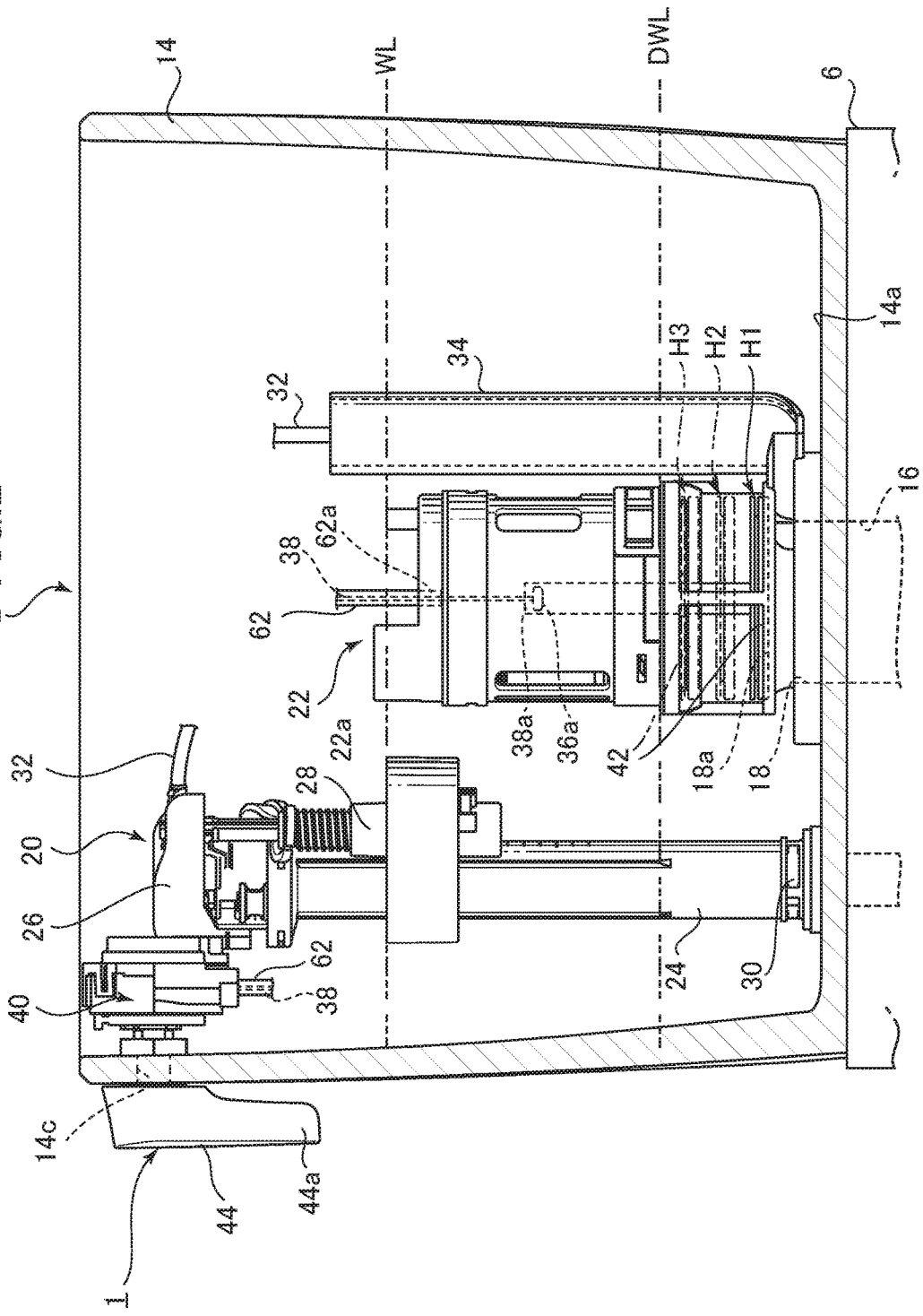
FIG. 2 is a front elevation cross sectional view showing the internal structure of the flush water tank assembly comprising the operating device for the flush water tank assembly according to the first embodiment of the invention.

Next, referring to FIG. 2, the internal structure of the flush water tank assembly is explained.

FIG. 2 is a front elevation cross sectional view showing the internal structure of the flush water tank assembly comprising the operating device for the flush water tank assembly according to a first embodiment of the invention.

As shown in FIG. 2, the flush water tank assembly 2 comprises a reservoir tank 14 for holding flush water to flush the flush toilet 4; a discharge path 18 communicating with the toilet main unit 6 water conduit 16 is formed on the bottom portion 14a of the reservoir tank 14, and flush water in the reservoir tank 14 is supplied to the toilet main unit 6 water conduit 16. The amount of stored flush water in the reservoir tank 14 differs depending on toilet type.

As shown in FIG. 2, a water supply apparatus 20 for supplying flush water into the reservoir tank 14, and a discharge valve apparatus 22 allowing the outflow of flush water in the reservoir tank 14 to the toilet main unit 6 by releasing the discharge port 18a formed on the top edge portion of the discharge path 18, are formed inside the flush water tank assembly 2 reservoir tank 14.

The water supply apparatus 20 comprises a water supply pipe 24, connected to an external water source (not shown) and extending from the bottom portion of the reservoir tank 14, a water supply valve 26, attached to the top end portion of this water supply pipe 24, for switching between spouting and cutting off flush water supplied into the reservoir tank 14 from the water supply pipe 24, and a float 28 for switching between spouting and cutting off of water spouting by the water supply valve 26, by moving up or down in response to fluctuations in the water level inside the reservoir tank 14.

A water spout port 30 is opened on the outer perimeter side bottom end portion of the water supply pipe 24, and flush water from the water supply valve 26 is spouted from the water spout port 30 into the reservoir tank 14.

The water supply apparatus 20 further comprises a refill pipe 32 connected to the water supply valve 26, and a portion of the refill pipe 32 is affixed to the overflow pipe 34 or to a predetermined location inside the reservoir tank 14 so that the refill pipe 32 downstream end portion is positioned close to the discharge valve apparatus 22 overflow pipe 34 top end opening.

Also, flush water inside the reservoir tank 14 is discharged by the discharge valve apparatus 22 into the toilet in an amount corresponding to the difference between a predetermined water level WL when full and a lower stopped water level (or dead water level) DWL; inside this water supply apparatus 20, the water level drops and a float 28 descends; this results in the opening of a water supply valve 26, starting the spouting of water from the water spout port 30, so that spouting of water into the reservoir tank 14 from a water source (not shown) outside the flush water tank assembly 2 is started.

Furthermore, when spouting continues and the water level inside the reservoir tank 14 rises, the float 28 also rises, causing the water supply valve 26 to close, so that spouting from the water spout port 30 is stopped. This results in the water level of the flush water inside the reservoir tank 14 being maintained at a predetermined water level WL when full.

Next, the discharge valve apparatus 22 is what is known as a direct drive discharge valve apparatus, comprising within it a discharge valve main unit 36 for opening and closing the discharge port 18a by moving up and down. This discharge valve apparatus has the same configuration as a conventional discharge valve apparatuses, so a specific explanation thereof is omitted, but one end portion 38a of the operating wire 38 in the operating device 1, described in detail below, is linked to the discharge valve main unit 36 top end portion 36a, and the other end portion 38b of the operating wire 38 is linked to a portion of the drive unit 40 of the operating device 1, described in detail below.

The amount of movement by the operating wire 38 corresponds to the amount of movement in the up-down direction by the valve body 42 at the bottom end portion of the discharge valve main unit 36; when the drive unit 40 is driven by a user rotating the operating handle 44 on the operating device 1, described in detail below, the raising of the operating wire 38 results in the raising of the valve body 42 so that the discharge port 18a is released for a predetermined time, and a fixed amount of flush water in the reservoir tank 14 is discharged from the discharge port 18a, through the discharge path 18 to the water conduit 16 in the toilet main unit 6, thereby flushing the toilet.

Note that in FIG. 2 the discharge valve main unit 36 valve body 42 with the discharge port 18a stopped at closed valve position H1 is shown by a solid line. The discharge valve main unit 36 valve body 42 with the discharge port 18a opened to a midway open valve position H2, above the closed valve position H1, and the discharge valve main unit 36 valve body 42 with the discharge port 18a released to a maximum valve open position (fully opened position) H3 higher again than the flush water tank assembly 2, are respectively shown by dotted lines.

Next, referring to FIGS. 2 through 12, the details of the operating device for the flush water tank assembly according to the first embodiment of the invention are explained.

Figure 3:
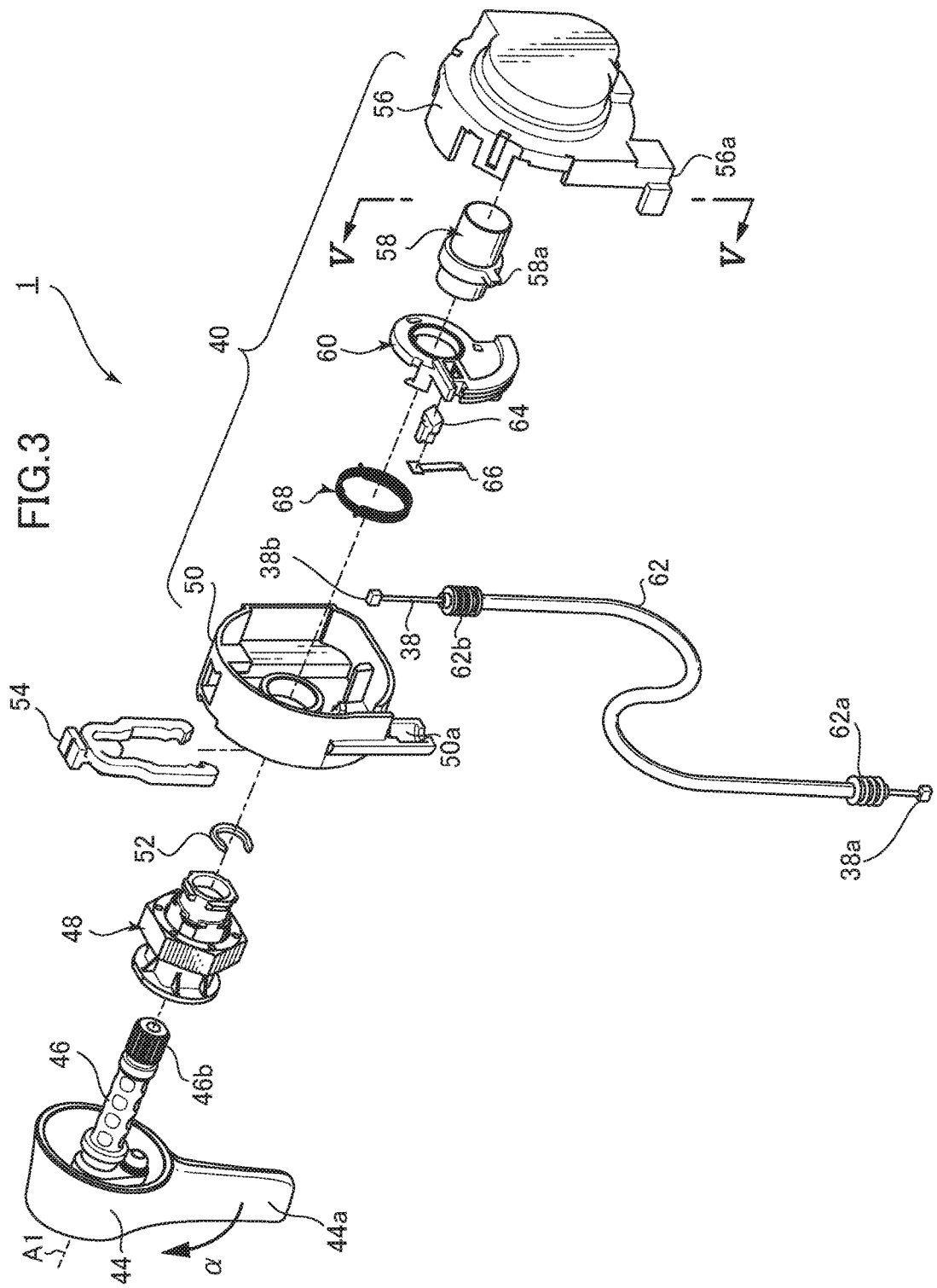
FIG. 3 is an exploded perspective view showing the operating device for the flush water tank assembly according to the first embodiment of the present invention.
Figure 4:
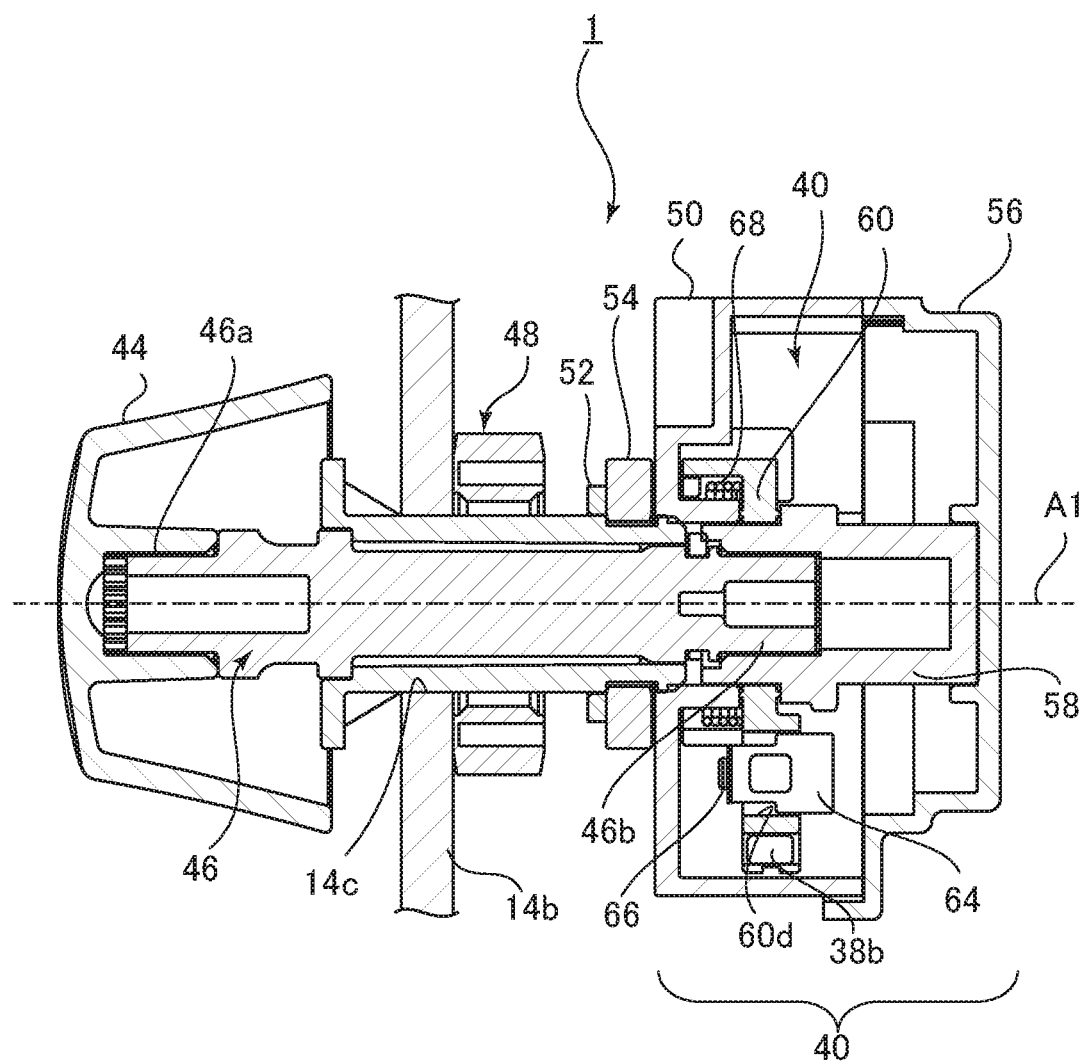
FIG. 4 is a plan view cross section showing the operating device for the flush water tank assembly according to the first embodiment of the present invention.

First, FIG. 3 is a partial perspective view showing the operating device for the flush water tank assembly, and FIG. 4 is a plan view cross section showing a flush water tank operating apparatus according to the first embodiment of the invention.

As shown in FIGS. 2 through 4, the operating device 1 according to the first embodiment of the invention comprises a rotary shaft 46, extending so as to penetrate from the inside to the outside of the reservoir tank 14; whereby this rotary shaft 46 is inserted into and rotatably attached to an attaching hole 14c formed to horizontally penetrate the reservoir tank side wall portion 14b on the left side and at the top of the outside of the reservoir tank 14 as seen from the toilet front.

An operating handle 44 is affixed and attached to the outside end portion 46a of the rotary shaft 46 positioned outside the reservoir tank 14, and this operating handle 44 is disposed at the left side portion of the reservoir tank 14 as seen from the front of the toilet. The operating handle 44 is what is known as a "pull-type handle," whereby grasping the gripping portion 44a extending from the operating handle 44 and raising the operating handle 44 from the front side as seen from the front of the flush water tank assembly 2, and rotating the operating handle 44 in a predetermined forward rotational direction α, enables the rotary shaft 46 to rotate about center axis line A1, with the rotary shaft 46 and the operating handle 44 integrated as a single piece.

Also, as shown in FIGS. 3 and 4, the operating device 1 comprises: a support member 48, placed between the operating handle 44 and the attaching hole 14c on the reservoir tank side wall portion 14b of the reservoir tank 14 reservoir tank, rotatably supporting the rotary shaft 46, and fasteners 52, 54 for affixing this support member 48 and the drive unit 40 casing 50.

Figure 5:
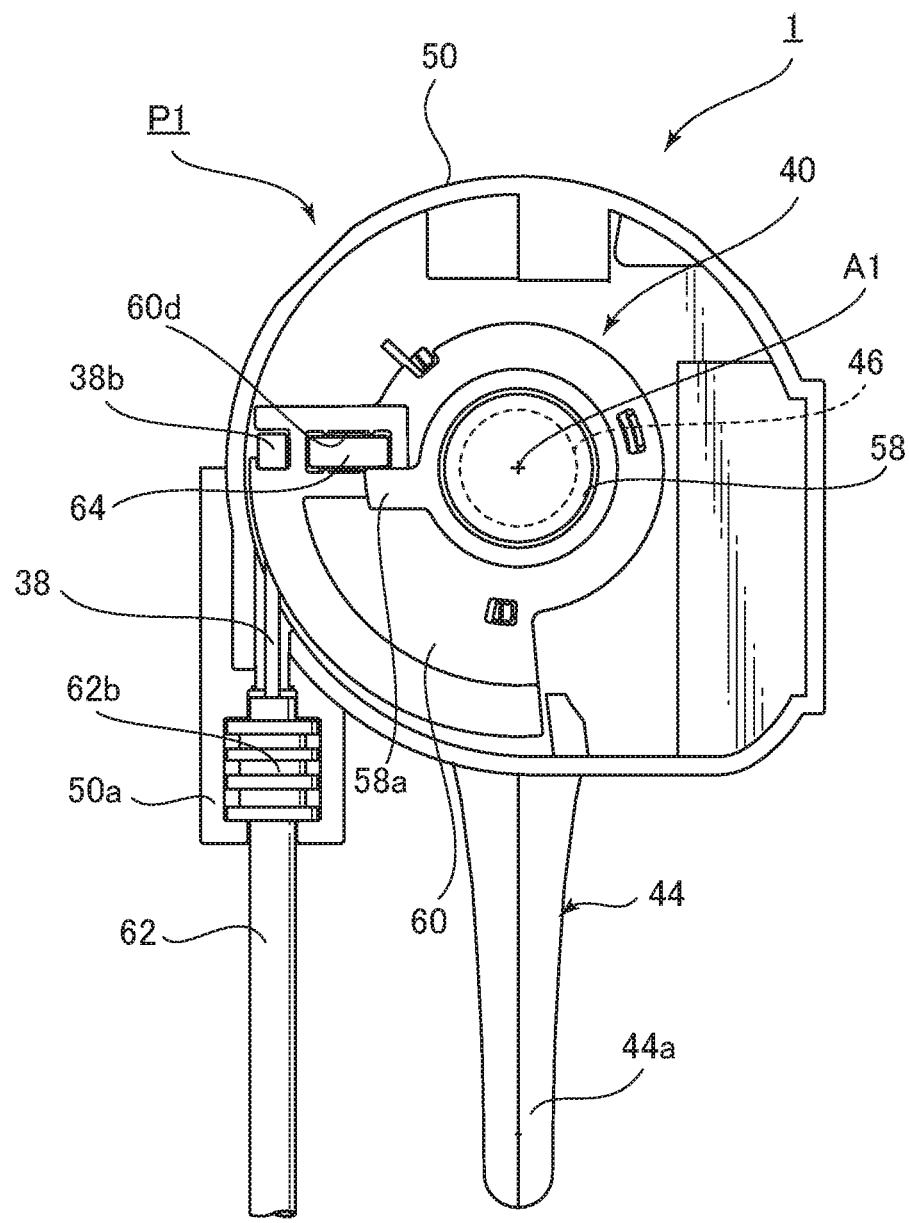
FIG. 5 is a cross sectional view along line V-V in FIG. 3, showing the standby state before the start and after the completion of the discharge valve main body closing operations of the operating handle, drive unit, and operating wire in the operating device for the flush water tank assembly according to the first embodiment of the invention.
Figure 6:
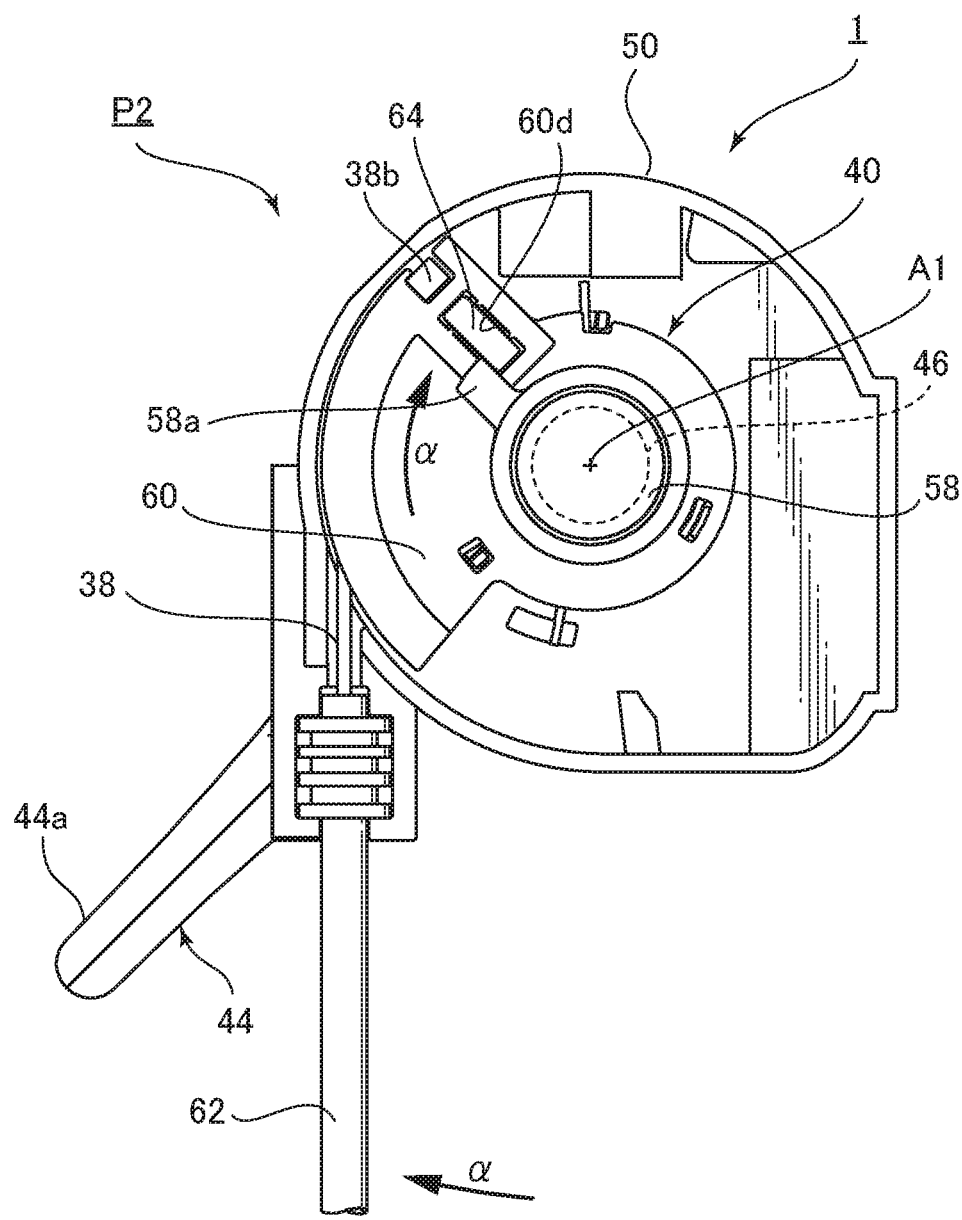
FIG. 6 is a cross sectional view similar to FIG. 5, showing the operating state midway through opening the discharge valve main body of the operating handle, drive unit, and operating wire in the operating device for the flush water tank assembly according to the first embodiment of the invention.
Figure 7:
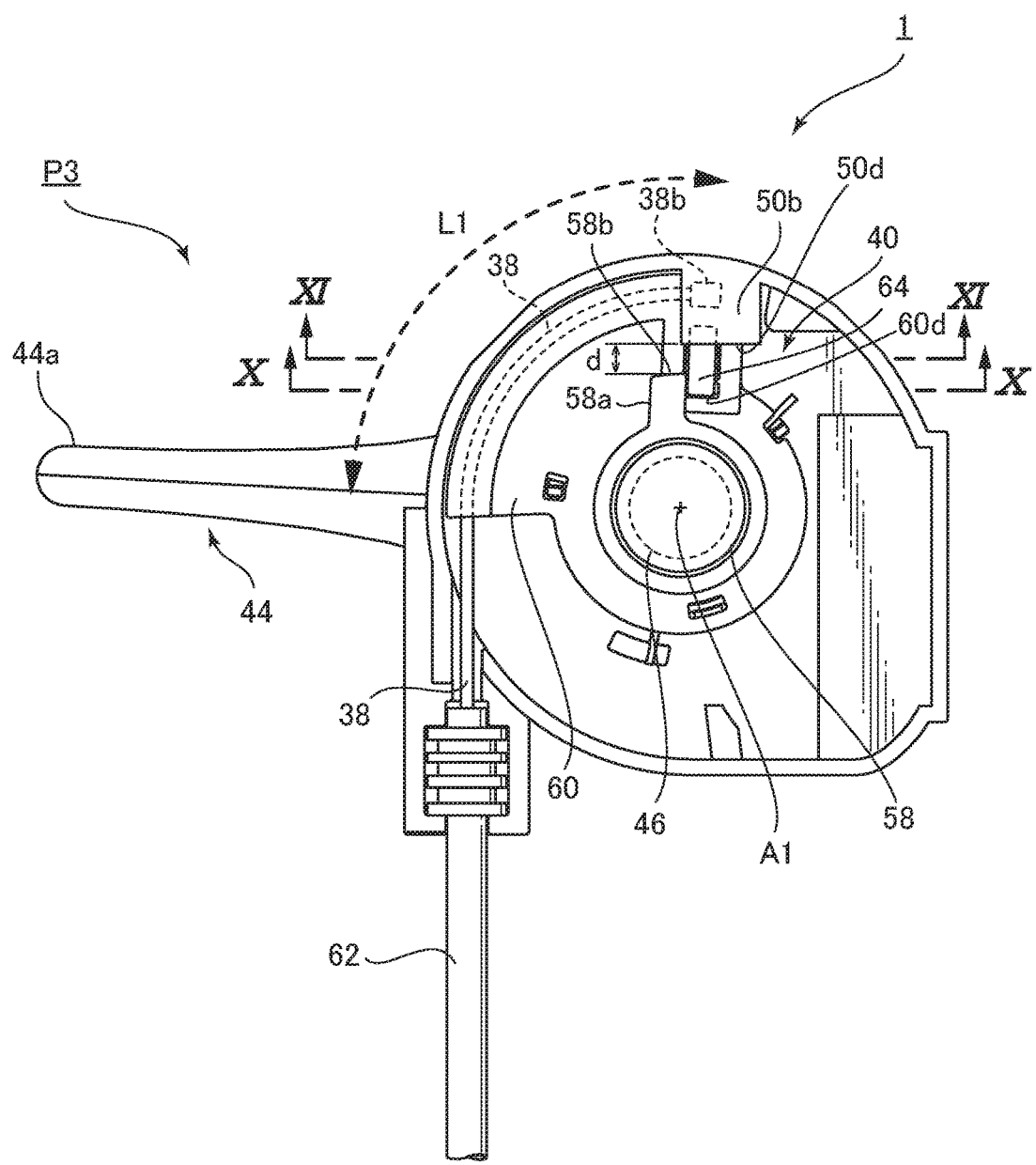
FIG. 7 is a cross sectional view similar to FIG. 5, showing the operating state of the operating handle, drive unit, and operating wire when the discharge valve main body is fully open in the operating device for the flush water tank assembly according to the first embodiment of the invention.

Next, FIG. 5 is cross sectional view along line V-V in FIG. 3, showing the standby state before the start and after the completion of the discharge valve main body closing operations of the operating handle, drive unit, and operating wire in the operating device for the flush water tank assembly according to a first embodiment of the invention; FIG. 6 is a cross sectional view similar to FIG. 5, showing the operating state midway through opening the discharge valve main body of the operating handle, drive unit, and operating wire in the operating device for the flush water tank assembly according to a first embodiment of the invention; FIG. 7 is cross sectional view similar to FIG. 5, showing the operating state, with the discharge valve main body fully open, of the operating handle, drive unit, and operating wire in the operating device for the flush water tank assembly according to a first embodiment of the invention.

As shown in FIGS. 2 through 5, the operating device 1 is attached to the inside end portion 46b of the rotary shaft 46 positioned on the inside of the reservoir tank 14, and to the inside end portion of the support member 48, and comprises a drive unit 40 to which the other end portion operating wire other end portion 38b of the operating wire 38 is linked; this drive unit 40 comprises a casing 50 and a cover member 56 attached so as to cover this casing 50.

As shown in FIGS. 2 and 5 through 7, the drive unit 40, by a rotational operation of the operating handle 44, can be moved from a standby state operating position P1 (see FIG. 5) prior to the start of opening, corresponding to the discharge valve main unit 36 valve body 42 closed valve position H1 (see FIG. 2), through an operating position P2 (see FIG. 6) corresponding to the discharge valve main unit 36 valve body 42 midway open valve position P2 (see FIG. 2), to an operating position P3 (see FIG. 7) corresponding to the discharge valve main unit 36 valve body 42 fully open position H3 (see FIG. 2).

Next, as shown in FIGS. 3 through 7, the drive unit 40 comprises a drive-side rotating member 58, which is built into the casing 50 and the cover member 56, and is affixed to the inside end portion 46b of the rotary shaft 46.

Note that in the present embodiment the state whereby the rotary shaft 46 and the drive-side rotating member 58 are separate members is explained, but both the rotary shafts 46 and 58 may be members integrally formed as a single unit.

As shown in FIGS. 3 through 7, the drive unit 40 comprises a rotary winding member 60, which is attached so as to rotate around center axis line A1 relative to the rotating member 58, and is formed of a pulley, whereby linking of the other end portion 38b of the operating wire 38 and rotation in the forward rotation direction α (the clockwise (rightward rotation) as seen in the plan view shown in FIG. 6) winds the operating wire 38 by a predetermined amount.

This drive-side rotating member 58 and rotary winding member 60 can be moved by rotation of the operating handle 44 from a standby state prior to start of operation operating position P1 (see FIG. 5) through a midway operating position P2, up to an operating position P3 (see FIG. 7).

Figure 8:
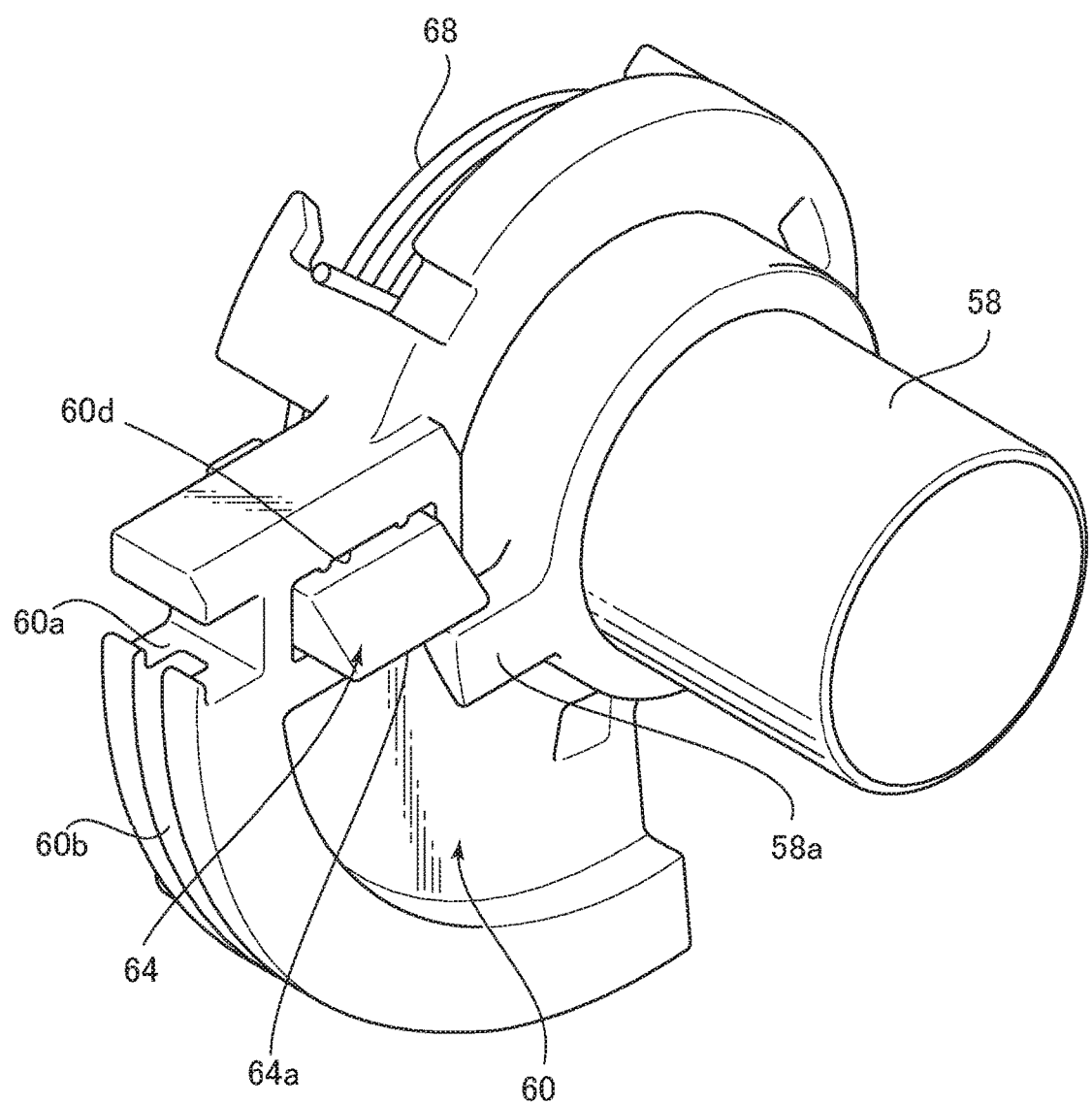
FIG. 8 is a perspective view seen from diagonally above in the axial inside direction (front side) of the rotary member and rotary winding member, respectively, in the drive unit of the operating device for the flush water tank assembly according to the first embodiment of the invention.
Figure 9:
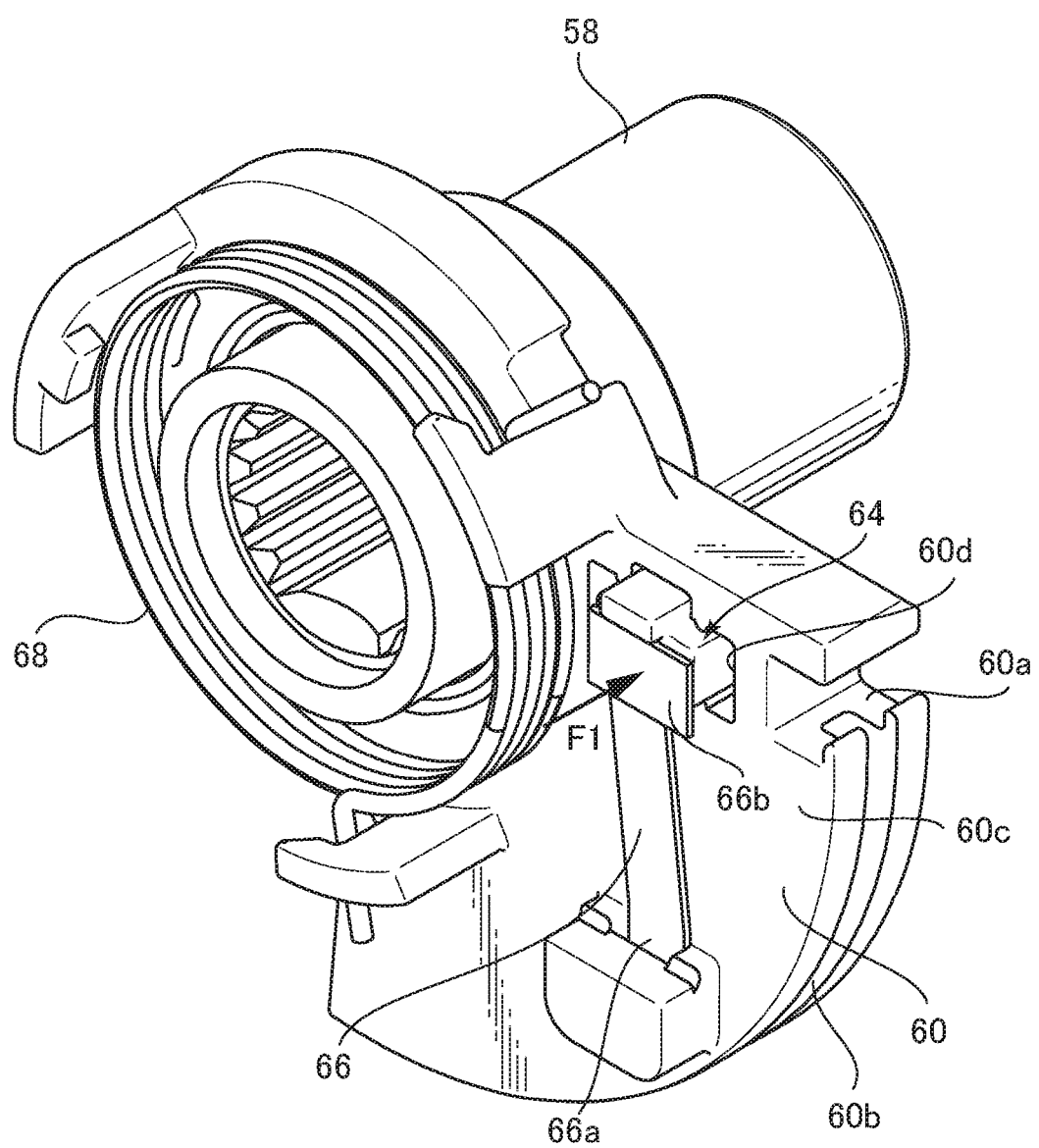
FIG. 9 is a perspective view seen from diagonally above of the axial outside direction (rear side) of the rotary member and rotary winding member, respectively, in the drive unit of the operating device for the flush water tank assembly according to the first embodiment of the invention.

Next, FIG. 8 is a perspective view seen from diagonally above in the axial inside direction (front side) of the rotary member and rotary winding member, respectively, in the drive unit of the operating device for the flush water tank assembly according to the first embodiment of the invention; FIG. 9 is a perspective view seen from diagonally above of the axial outside direction (rear side) of the rotary member and rotary winding member, respectively, in the drive unit of the operating device for the flush water tank assembly according to the first embodiment of the invention.

As shown in FIGS. 2 through 9, the operating wire 38 is made of metal such as stainless steel; it is passed through a flexible tube 62 and slides relative to this tube 62.

One end portion 62a of the tube 62 is affixed to the exterior casing 22a of the discharge valve apparatus 22 (see FIG. 2); the other end portion 62b of the tube 62 is connected to the tube connecting portions 50a, 56a disposed under the side wall portion of the casing 50 and the cover member 56 (see FIGS. 3 and 5).

Also, as shown in FIGS. 3 and 5 through 9, the other end portion 38b extending to the outer side from the tube 62 other end portion 62b is formed in a projecting shape, and is inserted into and engaged by the operating wire attaching hole 60a mounted close to the front end portion in the forward rotation direction α on the outer perimeter portion of the essentially fan-shaped rotary winding member 60.

As shown in FIGS. 8 and 9, a guide channel 60b is formed along the circumferential direction in order to guide the operating wire on the outer perimeter portion of the rotary winding member 60.

When the operating handle 44 is rotated to move the rotary winding member 60 along with the drive-side rotating member 58 from a standby state prior to start of operation at operating position P1 (see FIG. 5), through a midway operating position P2 (see FIG. 6), and up to operating position P3 (see FIG. 7), the operating wire 38 is wound by only a predetermined winding amount along the guide channel 60b and moves relative to the tube 62, so that the discharge valve main unit 36 valve body 42 is proportionally pulled up by a predetermined amount only.

For example, if the operating wire 38 is wound up by only a maximum wind-up amount L1 by the rotary winding member 60, the discharge valve main unit 36 valve body 42 rises to the maximum valve open position (fully open position) H3, as shown in FIG. 2.

Next, as shown in FIGS. 3 through 9, the drive unit 40 comprises a locking unit wherein the locking unit comprises a locking projection 64, and a thin plate spring 66, and the locking unit is disposed on the rotary winding member 60, and serves to lock the rotary winding member 60 to the drive-side rotating member 58.

Here, the drive-side rotating member 58 and the rotary winding member 60 are shown in a mutually locked state in FIGS. 5 and 6; the drive-side rotating member 58 and the rotary winding member 60 shown in FIG. 7 are shown immediately before their mutual lock is released.

As shown in FIG. 9, the thin plate spring 66 at one end comprises a fixed end portion 66a affixed to the rotary winding member 60 rear face 60c, and a free end portion 66b to which a locking projection 64 is attached at the other end.

In addition, as shown in FIGS. 4 through 9, an attaching hole 60d for a locking projection is formed on the rotary winding member 60 so as to penetrate in the axial direction; the locking projection 64 is slidably inserted from the rear surface side of the rotary winding member 60 into the locking projection attaching hole 60d, toward the front side.

Here, with the locking projection 64 inserted into the attaching hole 60d, a bias force F1 (see FIG. 9) acts constantly from the thin plate spring 66 free end portion 66b on the locking projection 64 on the locking projection 64, and from the rear surface side of the rotary winding member 60 toward the front side. The rotating member 58 and the rotary winding member 60 thus rotate from the operating position P1 (see FIG. 5) in the forward rotation direction α through the operating position P2 (see FIG. 6) until reaching the operating position P3 (see FIG. 7), and the locking projection 64 end portion 62a is in a state of projecting out from the rotary winding member 60 attaching hole 60d under the bias force F1.

Next, as shown in FIGS. 4 through 9, the rotating member 58 comprises a locking projecting portion 58a formed to project radially outward from a portion of the circumferential portion thereof.

In a state whereby the locking projection 64 locking projection tip portion 64a projects out from the rotary winding member 60 attaching hole 60d, contact of the rotating member 58 locking projecting portion 58a front end portion in the forward rotation direction α with the back end of the locking projection 64 tip portion 64a results in mutual locking between the rotary winding member 60 and the rotating member 58.

Figure 10:
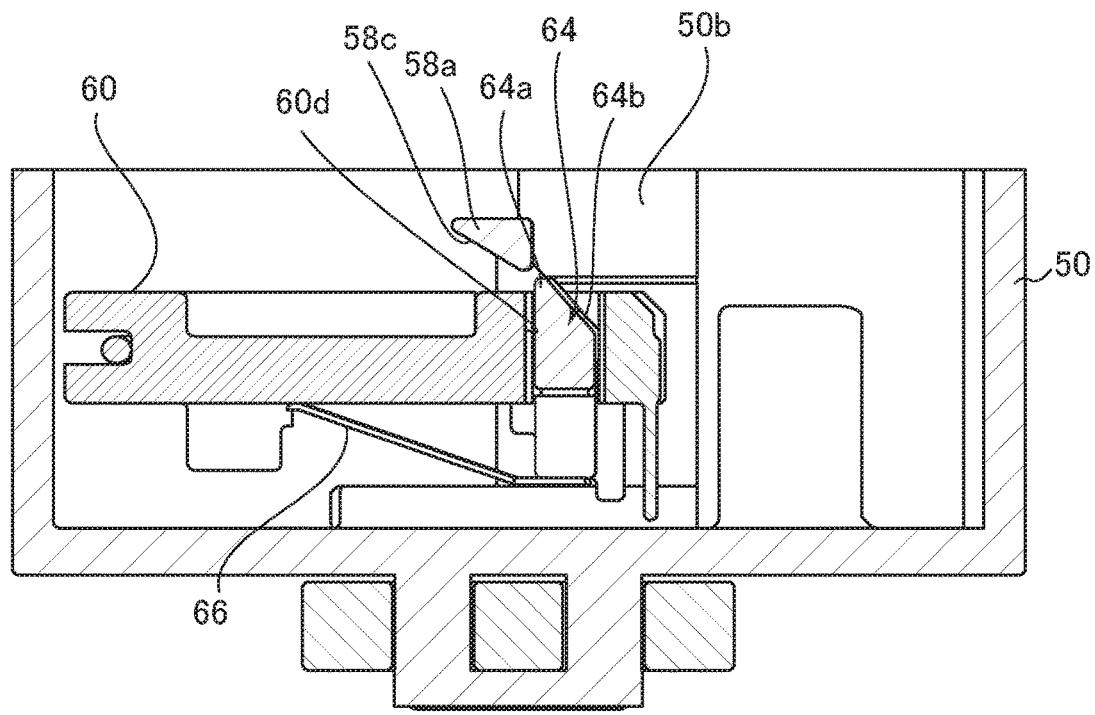
FIG. 10 is a cross sectional view along line X-X in FIG. 7.
Figure 11:
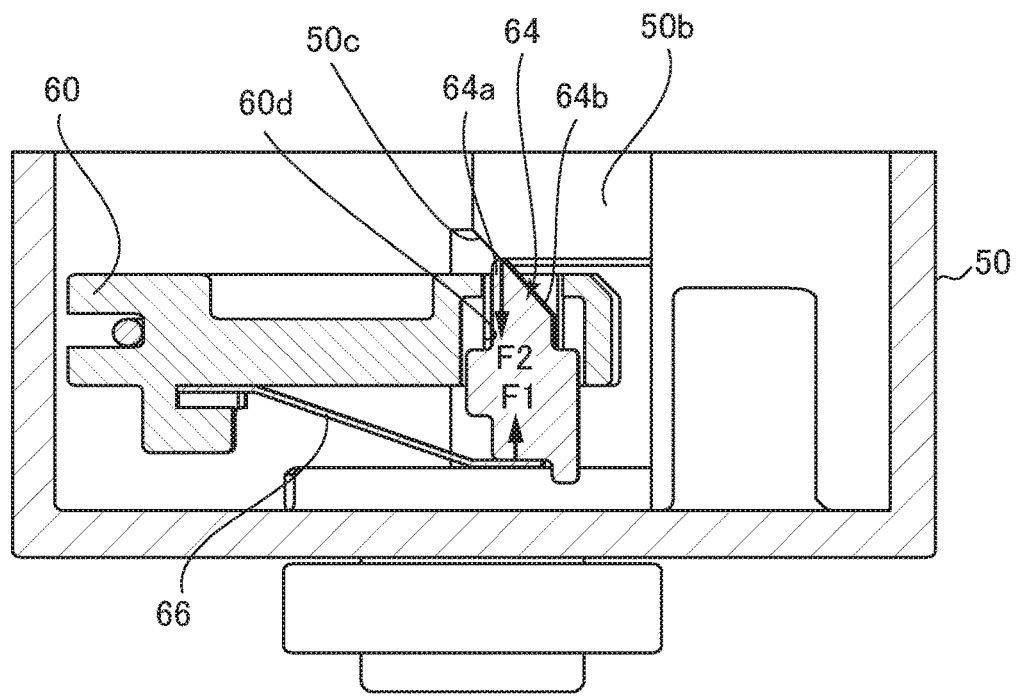
FIG. 11 is a cross sectional view along line XI-XI in FIG. 8.

Next, FIG. 10 is a cross sectional view along line X-X in FIG. 7; FIG. 11 is a cross sectional view along line XI-XI in FIG. 8.

As shown in FIGS. 7, 10, and 11, a lock release projecting portion 50b for releasing the lock between the rotary winding member 60 and the rotating member 58 by engagement with the locking projection 64 when the rotary winding member 60 reaches the operating position P3 is disposed inside the casing 50.

When the rotating member 58 and rotary winding member 60 rotate from the operating position P1 (see FIG. 5) in the forward rotation direction α through the operating position P2 (see FIG. 6) and reach the operating position P3 (see FIG. 7), the tip portion 64b on the front side of the forward rotation direction α in the locking projection 64 tip portion 64a contacts the sloped surface 50c on the bottom side and rear side of the lock release projecting portion 50b, so that the locking projection 64 is pressed downward by the lock release projecting portion 50b.

At this point, the downward pressing force F2 by the lock release projecting portion 50b shown in FIG. 11 in the locking projection 64 exceeds the upward bias force F1 by the thin plate spring 66 shown in FIG. 11, therefore the locking projection 64 tip portion 64a withdraws from a projecting state into the attaching hole 60d, and the lock with the rotating member 58 locking projecting portion 58a (see FIG. 10) is released.

Also, as shown in FIG. 7, the top end 58b of the locking projecting portion 58a of the rotating member 58, engaged with the locking projection 64 at operating position P3, and the end portion 50d of the lock release projecting portion 50b on the casing 50, are mutually separated by a predetermined distance d in the vertical direction.

Since the engaging part of the locking projection 64 engaged with the rotating member 58 locking projecting portion 58a and the engaging part of the locking projection 64 engaged with the casing 50 lock release projecting portion 50b are in this manner mutually separated, the rotating member 58 locking projecting portion 58a and the casing 50 lock release projecting portion 50b can be prevented from colliding with one another.

Figure 12:
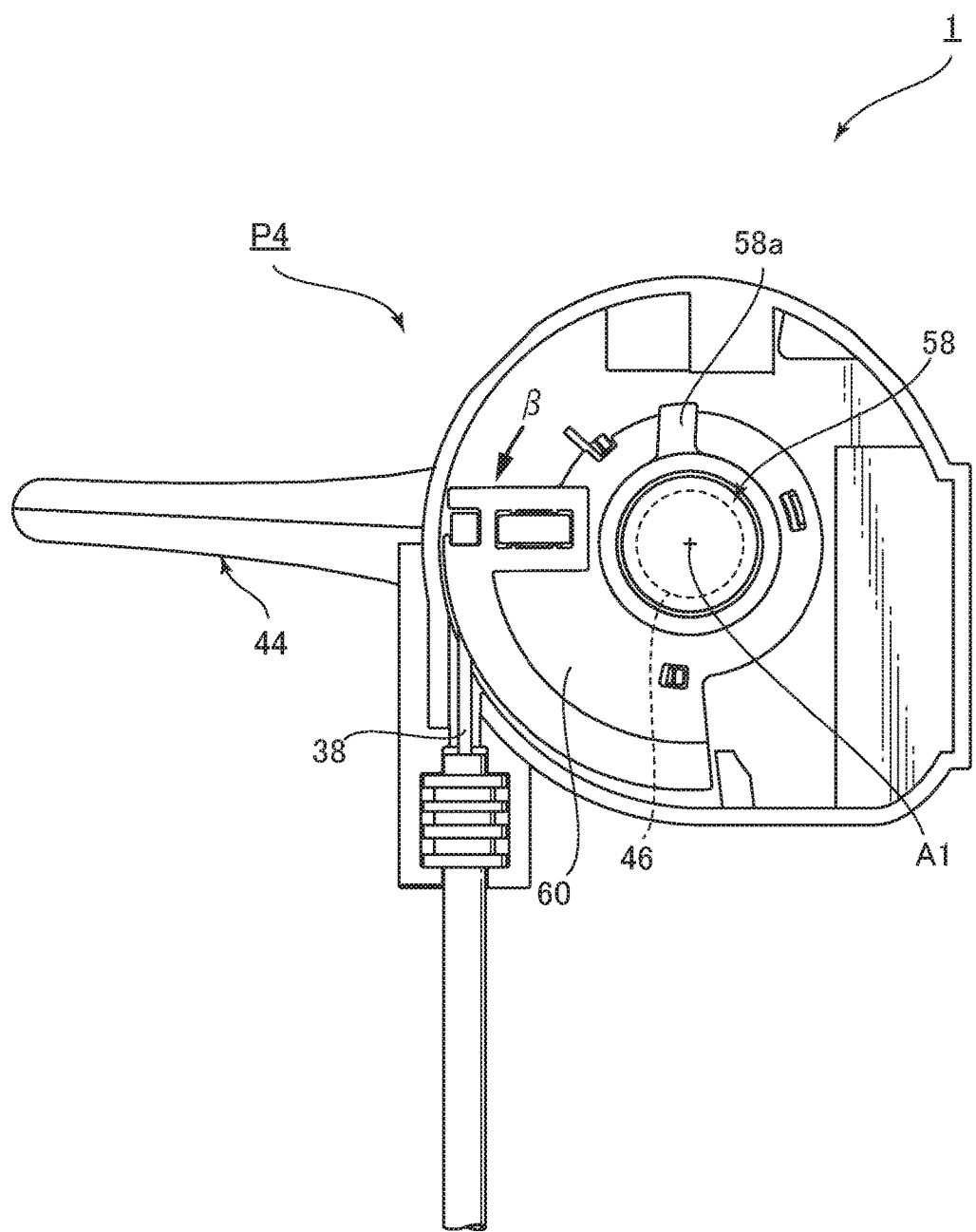
FIG. 12 is a cross sectional view similar to FIG. 5, showing the state in which, in the operating handle, drive unit, and operating wire for the operating device for the flush water tank assembly according to the first embodiment of the invention, the lock between the drive unit rotary member and rotary winding member is released, and only the rotary winding member is restored to a standby state.

Next, FIG. 12 is a cross sectional view similar to FIG. 5, showing the state in which, in the operating handle, drive unit, and operating wire for the operating device for the flush water tank assembly according to the first embodiment of the invention, the lock between the drive unit rotary member and rotary winding member is released, and only the rotary winding member is restored to a standby state.

As shown in FIGS. 3, 4, 8, and 9, the drive unit 40 comprises a return spring 68 disposed on the rear surface side of the rotary winding member 60 as a biasing portion for the rotary winding member, biasing the rotary winding member 60 so as to move it to operating position P4 when the rotary winding member 60 reaches the operating position P3; this return spring 68 is a twisted coil spring, affixed at one end to a part within the casing 50.

Note that in this embodiment, as one example of a rotary winding member biasing portion, we have explained a form in which a return spring 68 formed of a twisted coil spring was adopted, but spring elements other than twisted coil springs may also be adopted.

When the rotary winding member 60 rotates from the operating position P1 (see FIG. 5) in the forward rotation direction α through the operating position P2 (see FIG. 6), reaches the operating position P3 (see FIG. 7), and the lock between the rotary winding member 60 and the rotating member 58 is released, the rotary winding member 60 is biased by the return spring 68 so as to rotate in a predetermined valve-closing reverse rotation direction 3, therefore the rotary winding member 60 alone can be made to rotate in the reverse rotation direction β (the counterclockwise (left rotation) direction as seen in plan view in FIG. 12), which is the opposite direction to the forward rotation direction α, and is returned to the standby state operating position P4 (see FIG. 12).

I.e., as shown in FIG. 12, with the lock between the rotary winding member 60 and the rotating member 58 in a released state, even when the operating position P4 of the operating handle 44 and the rotating member 58 is maintained at the same position as the operating position P3 of the operating handle 44 and rotating member 58 shown in FIG. 7, only the rotary winding member 60 and the operating wire 38 can return to the standby state operating position P4, regardless of the operating positions of this operating handle 44, rotating member 58, and the like, so the discharge valve main unit 36 valve body 42 can descend to closed valve position H1 (see FIG. 2) together with the drop in the water level inside the reservoir tank 14, closing off the discharge port 18a.

Next, as shown in FIG. 10, the rear side and lower side surface in the forward rotation direction α on the rotating member 58 locking projecting portion 58a forms a sloped surface 58c. Thus, as shown in FIGS. 7 and 10, the lock between the rotating member 58 and the rotary winding member 60 is released at operating position P3 and, as shown in FIG. 12, after the rotary winding member 60 has returned to operating position P4, and when the rotating member 58 has furthermore returned to the standby state operating position P1 as shown in FIG. 5, the rotating member 58 locking projecting portion 58a sloped surface 58c opposes and engages the locking projection 64 sloped surface 64b, pressing the locking projection 64 in opposition to the bias force F1 of the thin plate spring 66, so that the rotating member 58 locking projecting portion 58a can pass over on the rear side of the locking projection 64 toward the forward rotation direction α (the bottom side of the locking projection 64 in FIG. 5).

Also, as shown in FIGS. 3, 4, and 9, the drive unit 40 comprises a return spring 68 formed of a twisted coil spring as a rotary winding member biasing portion for applying a bias to move the rotary winding member 60 to operating position P4 when the rotary winding member 60 reaches operating position P3.

Note that in this embodiment, as one example of a rotary winding member biasing portion, a form in which a return spring 68 formed of a twisted coil spring was adopted is explained, but spring elements other than twisted coil springs may also be adopted.

Next, referring to FIGS. 1 through 12, the operation (action) of the operating device for the flush water tank assembly according to the first embodiment of the invention is explained.

First, with respect to the operating handle 44 at the standby state operating position P1 shown in FIGS. 2 and 5, when a user grips the downward extending gripping portion 44a and rotates the operating handle 44 in the forward rotation direction α to start a toilet flush, raising the handle through the operating position P2 (see FIG. 6) on the front side as seen from the front in FIG. 2, up to operating position P3 (see FIG. 7), the rotary shaft 46 and the rotating member 58 form a single piece with the operating handle 44, and rotate about center axis line A1 to operating position P3.

Also, as shown in FIGS. 5 and 6, during the period until the operating handle 44 travels from operating position P1 to operating position P3, the rotating member 58 and the rotary winding member 60 are locked by contact of the forward rotation direction α front end portion of the rotating member 58 locking projecting portion 58a with the back end portion of the locking projection 64 in the forward rotation direction α, therefore the rotary winding member 60 also forms a single piece with the operating handle 44, rotary shaft 46, and rotating member 58, rotating about the center axis line A1.

By this means, as shown in FIG. 7, the operating wire 38 is wound by the rotary winding member 60, by only a maximum wind-up amount L1 and, as shown in FIG. 2, the discharge valve main unit 36 valve body 42 rises from closed valve position H1 to maximum valve open position (fully open position) H3. Then, as shown in FIGS. 1 and 2, flush water in the reservoir tank 14 is discharged from the discharge port 18a through the discharge path 18 to the toilet main unit 6 water conduit 16, and flush water is supplied from the toilet main unit 6 spout port 12, etc. into the bowl portion 8, thereby flushing the toilet.

At the same time, the locking projection 64 engages with the casing 50 lock release projecting portion 50b, releasing the lock between the rotating member 58 and the rotary winding member 60, therefore regardless of the operating handle 44 operating position, the rotary winding member 60 rotates in the reverse rotation direction β, opposite the forward rotation direction α, and moves to operating position P4 (see FIG. 12).

The discharge valve main unit 36 valve body 42 falls to closed valve position H1 together with the drop in the flush water level in the reservoir tank 14, and the water level in the reservoir tank 14 reaches the stopped water level (or dead water level) DWL.

At the point in time when the user releases his hand from the operating handle 44 gripping portion 44a, the operating handle 44, rotary shaft 46, and rotating member 58 also return to the standby state operating position P1.

According to the above-described operating device 1 for the flush water tank assembly according to the first embodiment of the present invention, when the toilet flushing operation (the discharge valve main unit 36 valve body 42 opening operation) is started and the discharge valve main unit 36 valve body 42 temporarily moves to a fully open position, at least the rotary winding member 60 and the operating wire 38 can move quickly to operating position P4, closing the discharge valve main unit 36 valve body 42, irrespective of the operating handle 44 operation, thus enabling toilet flushing in which the amount of flush water supplied from the discharge path 18 to the flush toilet 4 is controlled to a regulation amount.

The engagement at operating position P3 of the locking projection 64 with the casing 50 lock release projecting portion 50b, and release of the lock between the rotating member 58 and the rotary winding member 60, enables the time from the start of the discharge valve main unit 36 valve body 42 valve opening until valve closing to be shortened, and since the regulation flush water amount required for toilet flushing can be set relatively low, toilet flushing water conservation can be achieved.

In addition, according to the operating device 1 for the flush water tank assembly according to the first embodiment of the invention, until the rotating member 58 and the rotary winding member 60 rotate from operating position P1 in the forward rotation direction α to reach operating position P3, the locking projecting portion 58a engages a part of the locking projection 64 projecting from the rotary winding member 60 without engaging the casing 50 lock release projecting portion 50b, therefore the rotating member 58 and the rotary winding member 60 are locked.

In a state whereby the rotating member 58 and the rotary winding member 60 have rotated from operating position P1 in the forward rotation direction α and reached operating position P3, the engagement by a portion of the locking projection 64 with the casing 50 lock release projecting portion 50b results in the locking projection 64, which projects from the rotary winding member 60 and had been engaged with the rotating member 58 locking projecting portion 58a, being pressed by the pressing force F2 of the casing 50 lock release projecting portion 50b to oppose the bias force F1 of the thin plate spring 66 so that the engagement with the rotating member 58 locking projecting portion 58a is released, therefore the lock between the rotating member 58 and the rotary winding member 60 is released.

At this point, the engaging part of the locking projection 64 engaging the rotating member 58 locking projecting portion 58a and the engaging part of the locking projection 64 engaging the casing 50 lock release projecting portion 50b are set to be mutually separated, and since mutual collision between the rotating member 58 locking projecting portion 58a at operating position P3 with the casing 50 lock release projecting portion 50b can be prevented, the rotating member 58 and the rotary winding member 60 in a mutually locked state can, upon reaching operating position P3, quickly be moved to a lock-released state.

Also, even in a state where the operating handle 44 has been operated to operating position P3, or the operating handle 44 has been further rotated in the forward rotation direction α from operating position P3, the rotating member 58 locking projecting portion 58a does not collide with the casing 50 lock release projecting portion 50b, and the rotary winding member 60 has already rotated from operating position P3 in the reverse rotation direction β and moved to operating position P4, such that the rotating member 58 locking projecting portion 58a can pass over the locking projection 64, and the mutual engagement released state can be maintained, therefore rotation in the forward rotation direction α of the rotary winding member 60 together with the rotating member 58 resulting in unintentional opening of the discharge valve main unit 36 valve body 42 can be prevented.

Hence toilet flushing is possible in which the flush water amount supplied with each flush from the flush water tank 14 to the flush toilet 4 is controlled to a regulation amount.

In the operating device 1 for the flush water tank assembly of the first embodiment of the invention, by disposing the lock release projecting portion 50b, which is a lock release portion, on the inside of the casing 50, the forward side surface in the forward rotation direction α of the locking projection 64 engaging the lock release projecting portion 50b forms a sloped surface 64b when the rotary winding member 60 rotates from operating position P1 in the forward rotation direction α and reaches operating position P3, therefore in a state in which the rotating member 58 and the rotary winding member 60 have rotated in the forward rotation direction α from operating position P1 and reached operating position P3, the sloped surface 64b formed on the forward surface of the locking projection 64 in the forward rotation direction α can more easily engage the casing 50 lock release projecting portion 50b.

Therefore the locking projection 64, which projects out from the rotary winding member 60 and was engaged with the rotating member 58 locking projecting portion 58a, is more easily pressed against the bias force F1 of the thin plate spring 66 by the casing 50 lock release projecting portion 50b at operating position P3, and the lock between the locking projection 64 and the rotating member 58 locking projecting portion 58a can also be easily released.

Hence the rotating member 58 and the rotary winding member 60 can be moved quickly from the mutually locked state obtaining from operating position P1 until reaching operating position P3, to a mutually unlocked state, at the point of reaching operating position P3.

Therefore toilet flushing is enabled in which the flush water amount supplied with each flush from the flush water tank 14 to the flush toilet 4 is controlled to a regulation amount.

Furthermore, in the operating device 1 for the flush water tank of the first embodiment of the invention, the part which engages the locking projection 64 sloped surface 64b in the casing 50 lock release projecting portion 50b forms a sloped surface 50c when the rotary winding member 60 reaches operating position P3, therefore in a state in which the rotating member 58 and the rotary winding member 60 rotate in the forward rotation direction α from operating position P1 to operating position P3, the sloped surface 64b formed on the front surface in the forward rotation direction α of the locking projection 64 more easily engages the sloped surface 50c on the casing 50 lock release projecting portion 50b.

Hence the locking projection 64, which projects out from the rotary winding member 60 and was engaged with the rotating member 58 locking projecting portion 58a, is effectively more easily pressed against the bias force F1 of the thin plate spring 66 by the casing 50 sloped surface 50c, and the lock between the locking projection 64 and the rotating member 58 locking projecting portion 58a can also be more easily released.

As a result, the rotary member 58 and the rotary winding member 60 can, upon reaching the third operating position, be more quickly moved from a mutually locked state to a mutually unlocked state.

Therefore toilet flushing is enabled in which the flush water amount supplied with each flush from the flush water tank 14 to the flush toilet 4 is controlled to a regulation amount.

Also, according to the operating device 1 for the flush water tank of the first embodiment of the invention, when the lock between rotating member 58 and the rotary winding member 60 is released at operating position P3 and the rotating member 58 returns to operating position P1 after the rotary winding member 60 returns to operating position P4, the surface at the back side of the rotating member 58 locking projecting portion 58a opposing the locking projection 64 sloped surface 64b forms a sloped surface 58c (see FIG. 10) enabling the rotating member 58 locking projecting portion 58a to pass over the rear side of the locking projection 64, therefore when returning rotating member 58 to operating position P1 by operation of the operating handle 44, the rotating member 58 locking projecting portion 58a rear side sloped surface 58c engages the locking projection 64 sloped surface 64b and pushes against the bias force F1 of the thin plate spring 66 so that the rotating member 58 locking projecting portion 58a can quickly pass over the rear side of the locking projection 64 (the lower side of the locking projection 64 in FIG. 5).

In the passed-over state, the locking projection 64 projects out from the rotary winding member 60 attaching hole 60d under the bias force F1 of the thin plate spring 66 and quickly engages the rotating member 58 locking projecting portion 58a, so the rotating member 58 and the rotary winding member 60 can again be locked and placed in a standby state at operating position P1.

Preparations for starting the next toilet flushing can therefore be quickly and reliably performed, and the next toilet flushing can also be carried out with flush water supplied from the flush water tank 14 to the toilet 4 reliably controlled to the regulated amount.

In addition, according to the operating device 1 for the flush water tank assembly of the first embodiment of the invention, the drive unit 40 comprises a return spring 68, so that when the rotary winding member 60 reaches operating position P3, the rotary winding member 60 is moved to operating position P4, therefore when the discharge valve main unit 36 valve body 42 opening operation is started and the rotary winding member 60 rotates from operating position P1 in the forward rotation direction α and reaches operating position P3 so that the discharge valve main unit 36 valve body 42 moves from closed valve position H1 to maximum valve open position H3, the lock between the rotating member 58 and the rotary winding member 60 is released, and when the rotary winding member 60 and the operating wire 38 move to operating position P4, the rotary winding member 60 and operating wire 38 can be more quickly and reliably moved to operating position P4 by the biasing force of the drive unit 40 return spring 68, even if there is some sliding resistance or the like, and the discharge valve main unit 36 valve body 42 can be more quickly and reliably closed.

Therefore toilet flushing is enabled in which the flush water amount supplied with each flush from the flush water tank 14 to the flush toilet 4 is controlled to a regulation amount.

Also, according to the operating device 1 for the flush water tank assembly of the first embodiment of the invention, performing a rotary operation to raise the operating handle 44 from operating position P1 up to operating position P3 when starting the supply of flush water to the toilet results in the rotating member 58 and the rotary winding member 60 respectively rotating in the same predetermined valve opening direction (forward rotation direction α) from operating position P1 to operating position P3; thereafter when the rotary winding member 60 reaches operating position P3, the engagement of the locking projection 64 with the lock release projecting portion 50b, which is the lock release portion, results in the release of the lock between the rotating member 58 and the rotary winding member 60, therefore irrespective of the operating handle 44 operation, the operating handle 44 can be rotated in a predetermined valve closing direction (reverse rotation direction β) and moved to operating position P4.

I.e., when the discharge valve main unit 36 valve body 42 valve opening operation is started and the discharge valve main unit 36 temporarily moves to fully open position H3, at least the rotary winding member 60 and the operating wire 38 can move quickly to operating position P4 irrespective of the operating handle 44 operation, closing the discharge valve main unit 36, therefore toilet flushing can be accomplished in which the amount of flush water supplied from the reservoir tank 14 to the toilet in each toilet flushing can be controlled to a regulation amount.

Also, because the time from the start of the discharge valve main unit 36 valve body 42 opening operation (the discharge valve main unit 36 opening time) can be shortened, the regulation flush water amount required for toilet flushing can be set relatively low, and toilet flush water can be conserved.

Figure 13:
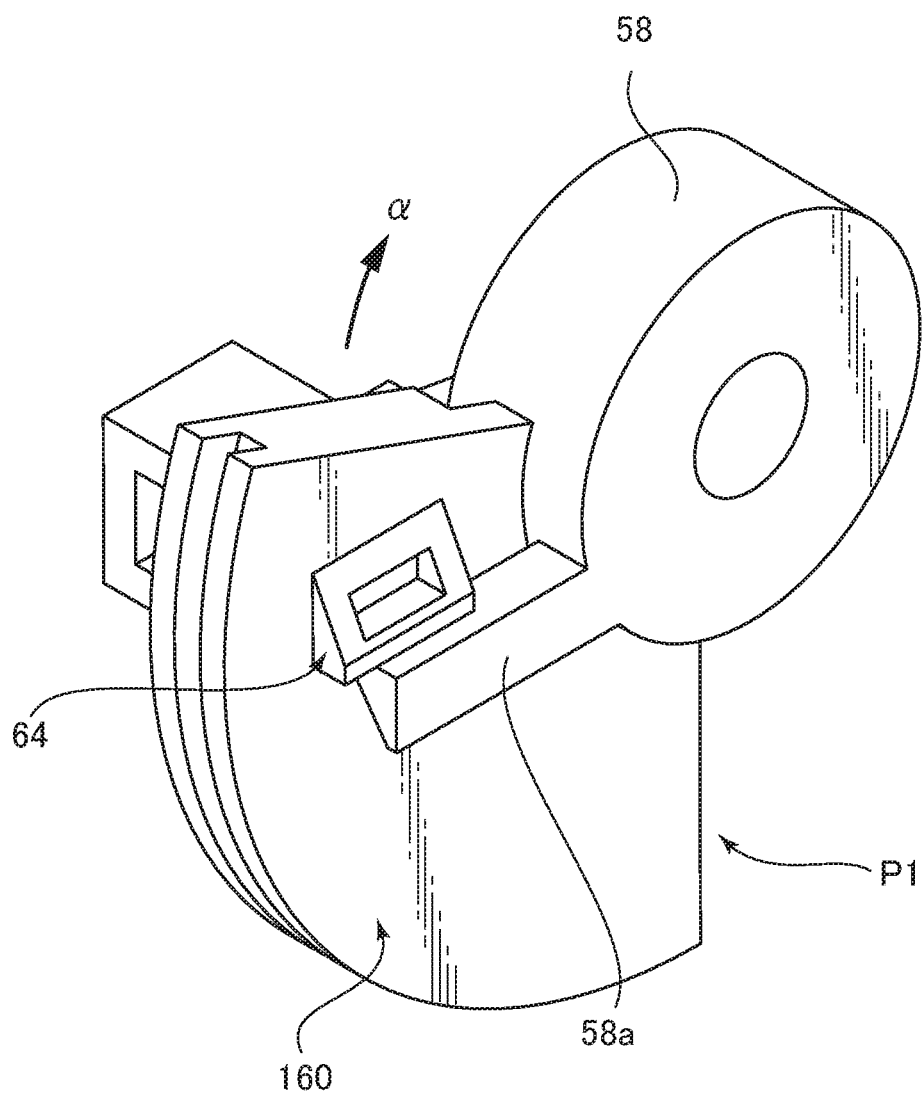
FIG. 13 is a perspective view seen from diagonally above of the axial direction inside (front elevation side) of the rotary member and rotary winding member, respectively, in a drive unit of an operating device for a flush water tank assembly according to a second embodiment of the invention.
Figure 14:
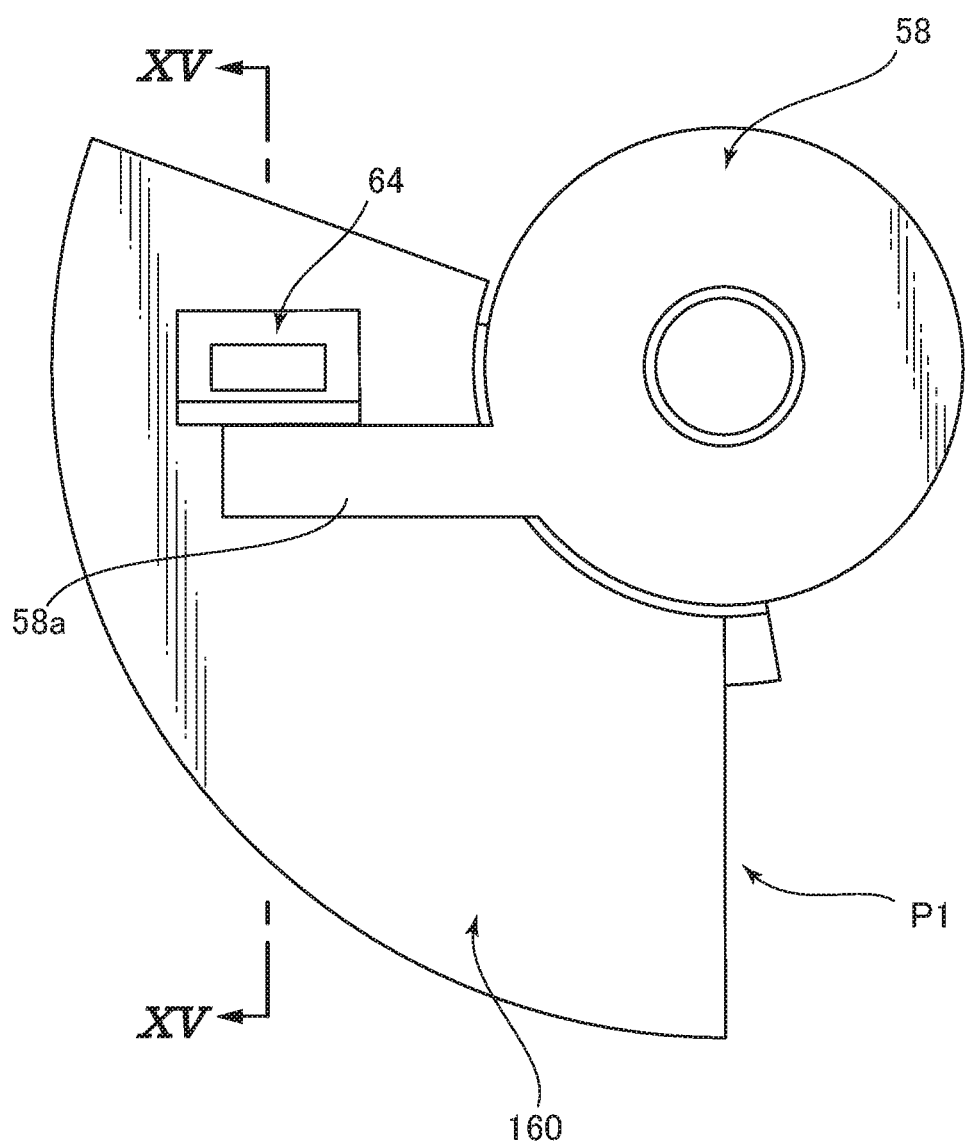
FIG. 14 is a plan view seen from the axial direction inside (front elevation side) of the rotary member and rotary winding member, respectively, in the drive unit of the operating device for the flush water tank assembly according to the second embodiment of the invention.
Figure 15:
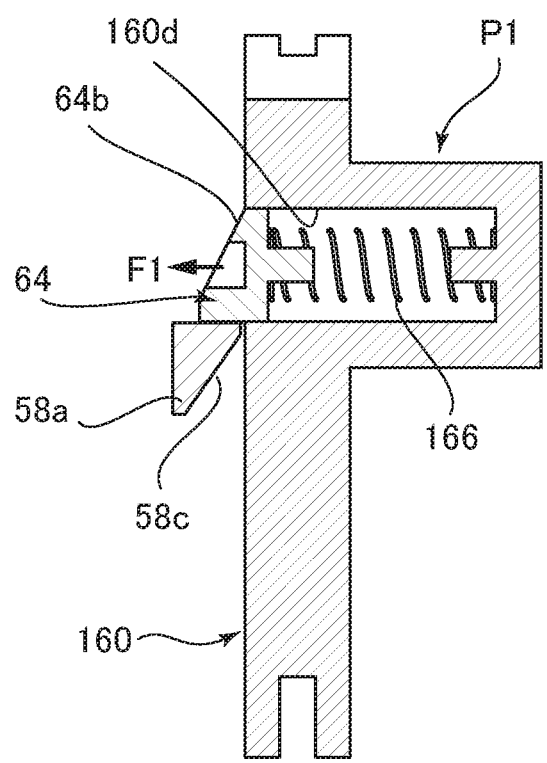
FIG. 15 is a cross sectional view along line XV-XV in FIG. 14.

Next, referring to FIGS. 13 through 15, the details of an operating device for a flush water tank assembly according to a second embodiment of the invention are explained.

FIG. 13 is a perspective view seen from diagonally above of the axial direction inside of the rotary member and rotary winding member, respectively, in a drive unit of an operating device for a flush water tank assembly according to the second embodiment of the invention; FIG. 14 is a plan view seen from the axial direction inside (front elevation side) of the rotary member and rotary winding member, respectively, in the drive unit of the operating device for the flush water tank assembly according to the second embodiment of the invention; FIG. 15 is a cross sectional view along line XV-XV in FIG. 14.

Note that in the operating device according to the second embodiment of the invention shown in FIGS. 13 through 15, the same reference numerals are used for the same parts of the operating device as the above-described first embodiment of the invention, and an explanation thereof is omitted.

First, in the operating device according to the second embodiment of the invention, as a biasing portion for biasing the locking projection 64 for locking the drive unit rotating member 58 and the rotary winding member 160, a compression coil spring 166 is disposed on the rotary winding member 160 lock projection attaching hole 160d in place of the thin plate spring 66 for biasing the drive unit 40 locking projection 64 on the operating device 1 according to the above-described first embodiment of the invention.

In the operating device according to the second embodiment of the invention thus constituted, as in the operating device 1 according to the above-described first embodiment of the invention, in the operating device 1 in standby state, the locking projection 64 projects outward from the rotary winding member 160 attaching hole 160d under the bias force F1 of the compression coil spring 166, thereby engaging the rotating member 58 projecting portion 58a so that the rotary winding member 160 and the rotating member 58 are locked, and the rotary winding member 160 also rotates together with the rotating member 58 from the operating position P1 in the forward rotation direction α until reaching operating position P3.

In a state whereby the rotating member 58 and the rotary winding member 160 have rotated from operating position P1 in the forward rotation direction α and reached operating position P3, the engagement by a portion of the locking projection 64 with the casing 50 lock release projecting portion 50b causes the locking projection 64, which projects from the rotary winding member 160 and had been engaged with the rotating member 58 locking projecting portion 58a, to be pressed by the pressing force F2 of the casing 50 lock release projecting portion 50b in opposition to the bias force F1 of the compression coil spring 166, so that the engagement with the rotating member 58 locking projecting portion 58a is released, therefore the lock between the rotating member 58 and the rotary winding member 160 is released.

Since the time from the start of the discharge valve main unit 36 valve body 42 opening operation (the discharge valve main unit 36 valve body 42 opening time) can be shortened, the regulation flush water amount required for toilet flushing can be set relatively low, and toilet flush water can be conserved.

Next, referring to FIGS. 16 through 24, the details of an operating device for a flush water tank assembly according to a third embodiment of the invention are explained.

Figure 16:
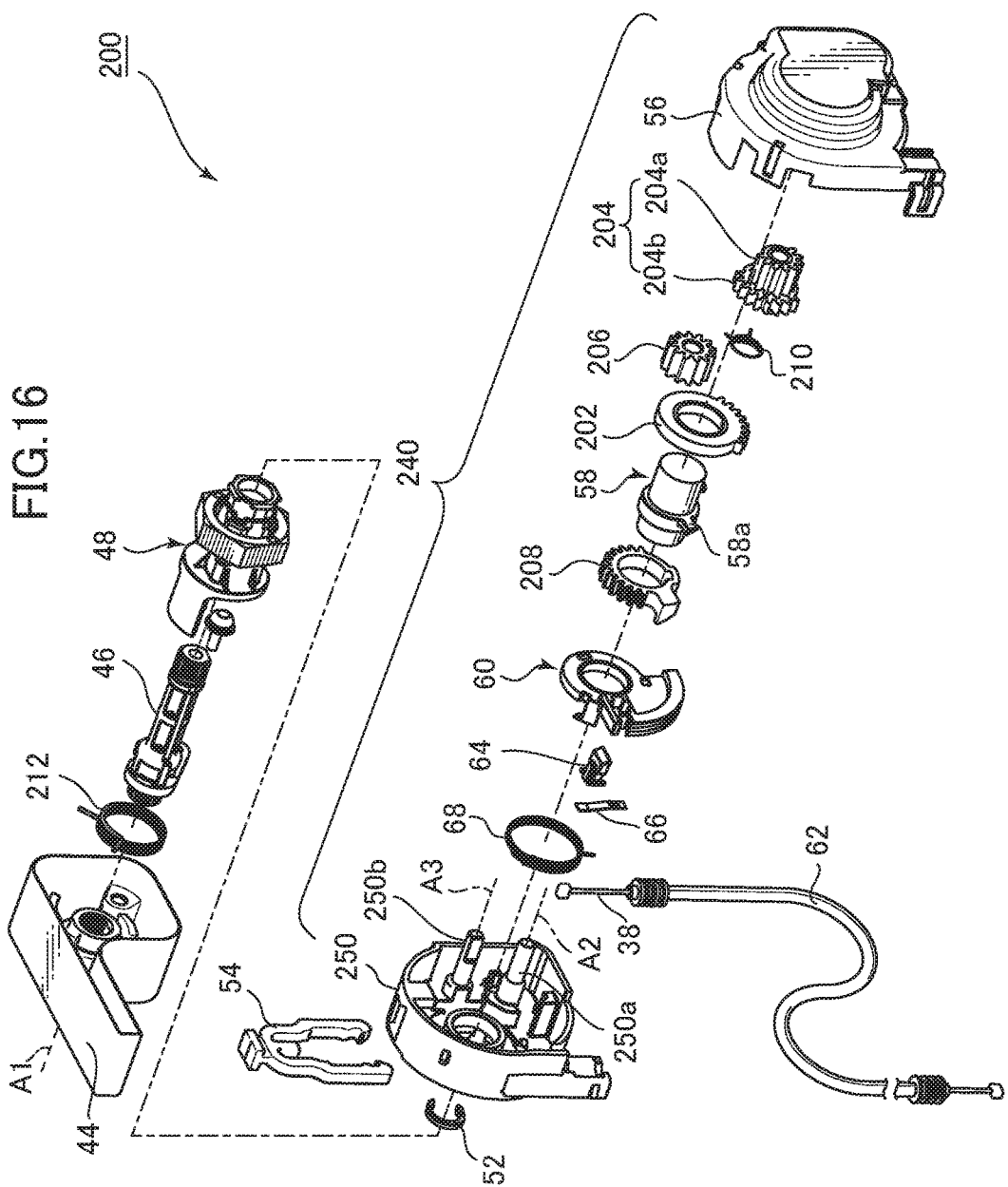
FIG. 16 is an exploded perspective view showing an operating device for a flush water tank assembly according to a third embodiment of the present invention.
Figure 17:
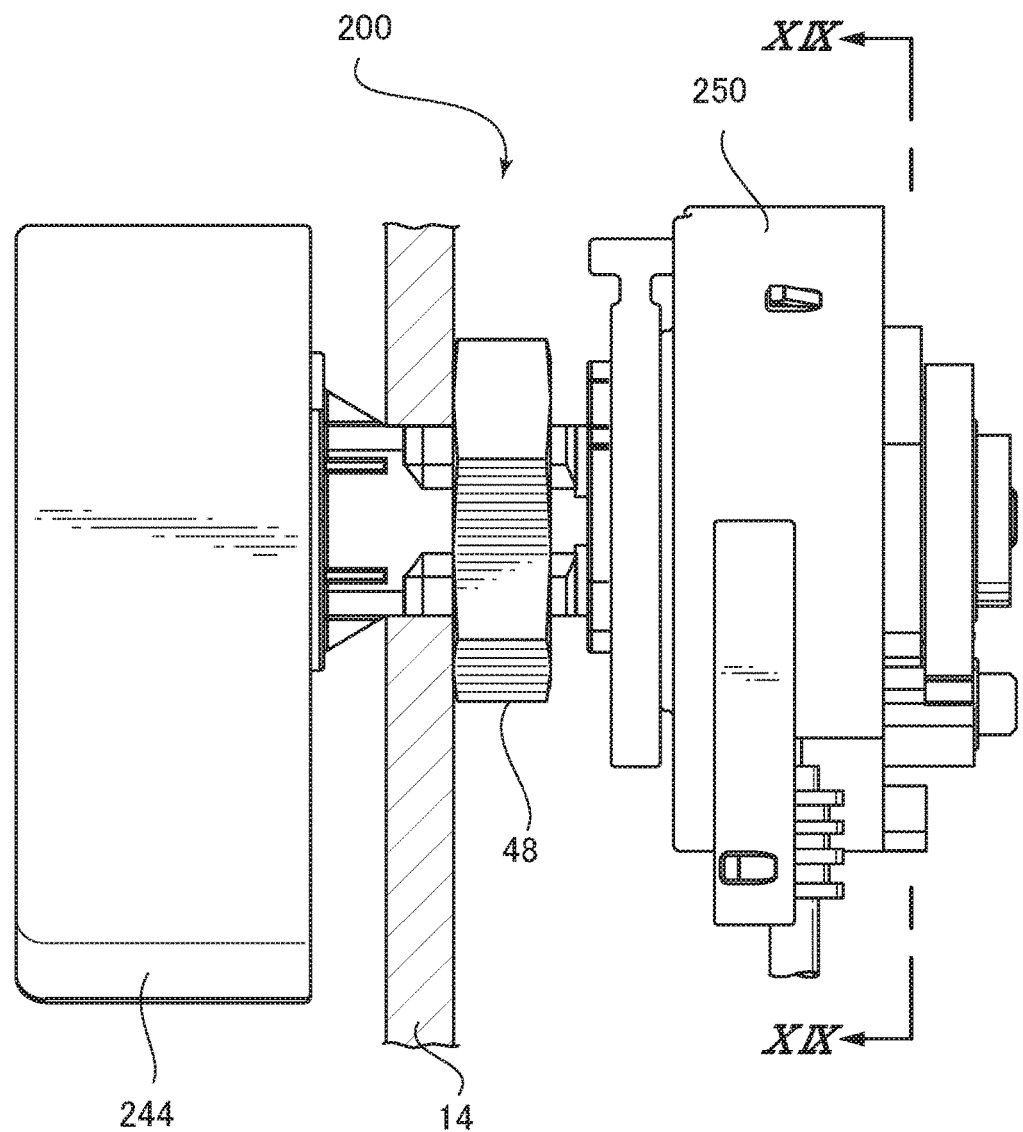
FIG. 17 is a plan view of the operating device for the flush water tank assembly according to the third embodiment of the invention, showing the state whereby the axial direction inside cover member has been removed.

First, FIG. 16 is an exploded perspective view showing an operating apparatus for a flush water tank assembly according to a third embodiment of the present invention, and FIG. 17 is a plan view of the operating device for the flush water tank assembly according to the third embodiment of the invention, showing the state whereby the axial direction inside cover member has been removed.

Figure 18:
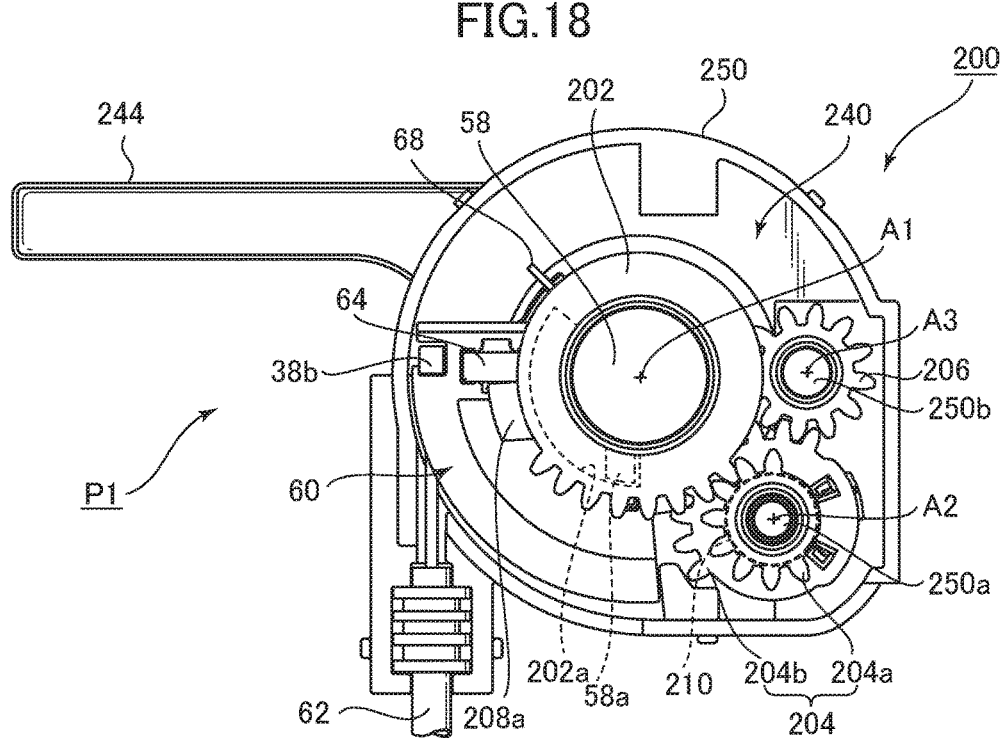
FIG. 18 is a side elevational view seen from the inside of a reservoir tank in the operating device for the flush water tank assembly according to the third embodiment of the invention shown in FIG. 17.
Figure 19:
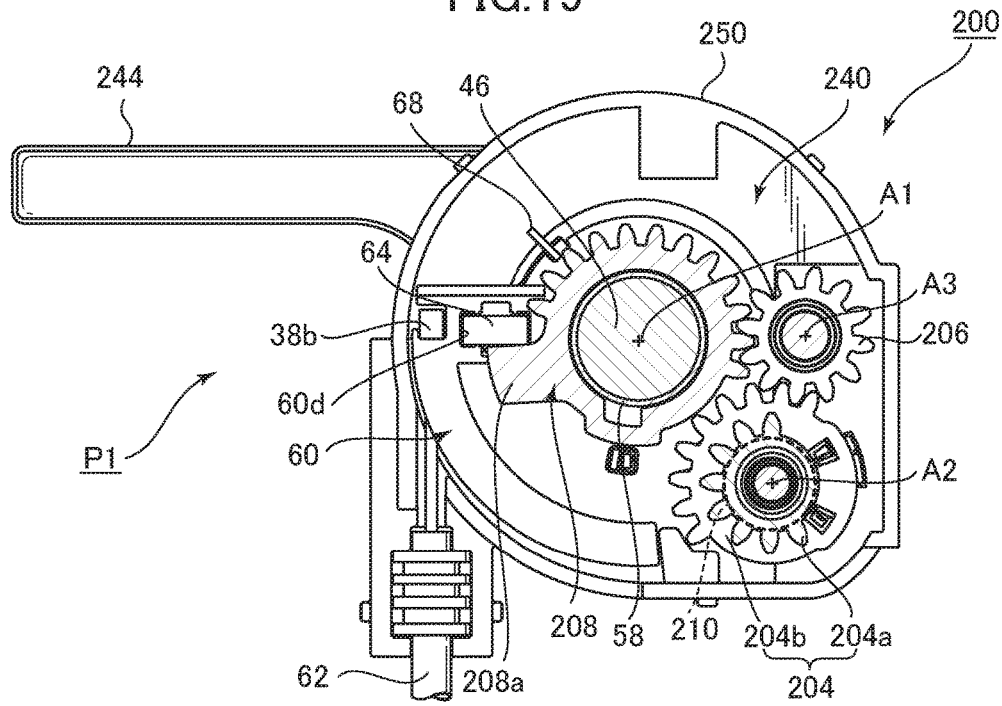
FIG. 19 is a cross sectional view along line XIX-XIX in FIG. 17.
Figure 20:
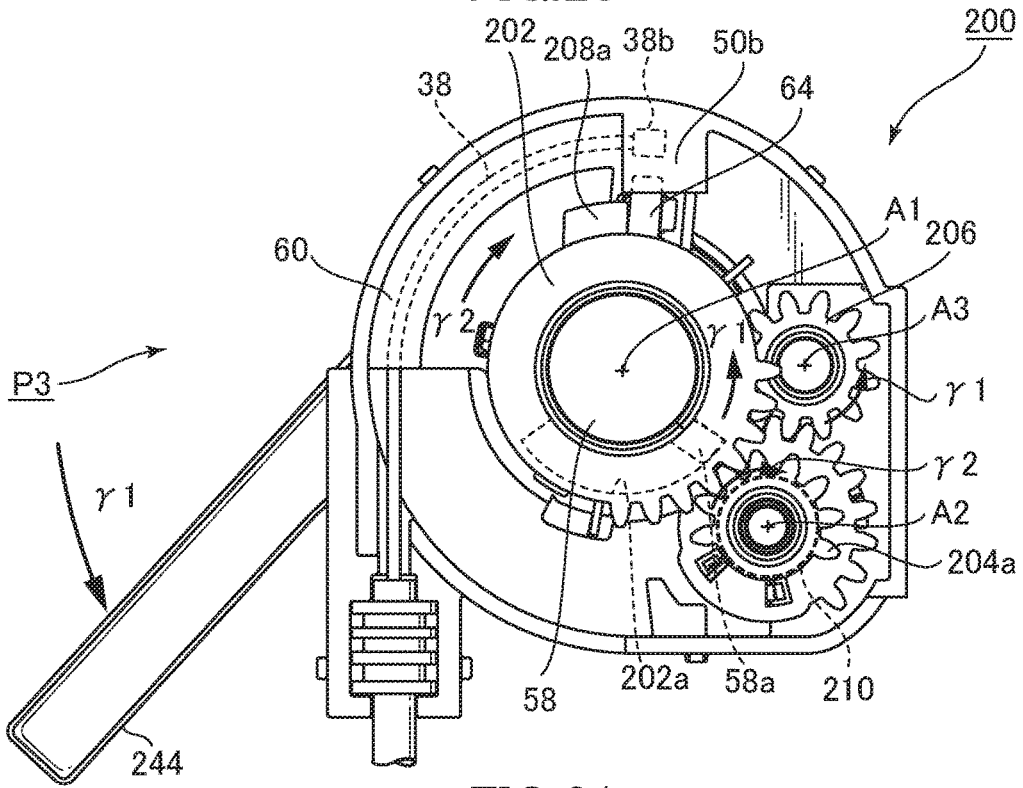
FIG. 20 is a side elevational view similar to FIG. 18, showing the operating state, with the discharge valve main body fully open, of the operating handle, drive unit, and operating wire in the operating device for the flush water tank assembly according to the third embodiment of the invention.
Figure 21:
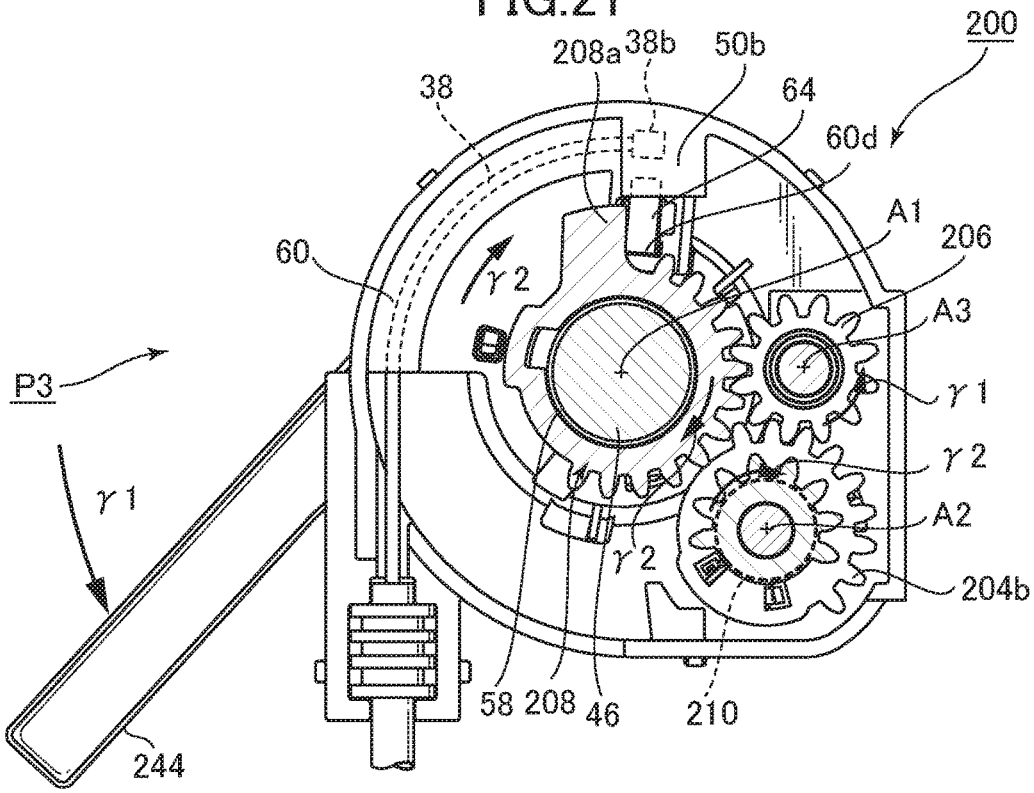
FIG. 21 is a cross sectional view similar to FIG. 19, showing the operating state, with the discharge valve main body fully open, of the operating handle, drive unit, and operating wire in the operating device for the flush water tank assembly according to the third embodiment of the invention.

FIG. 18 is a side elevational view seen from the inside of a reservoir tank in the operating device for the flush water tank assembly according to the third embodiment of the invention shown in FIG. 17; FIG. 19 is a cross sectional view along line XIX-XIX in FIG. 17; FIG. 20 is a side elevational view similar to FIG. 18, showing the operating state, with the discharge valve main body fully open, of the operating handle, drive unit, and operating wire in the operating device for the flush water tank assembly according to the third embodiment of the invention; FIG. 21 is a cross sectional view similar to FIG. 19, showing the operating state, with the discharge valve main body fully open, of the operating handle, drive unit, and operating wire in the operating device for the flush water tank assembly according to the third embodiment of the invention.

Figure 22:
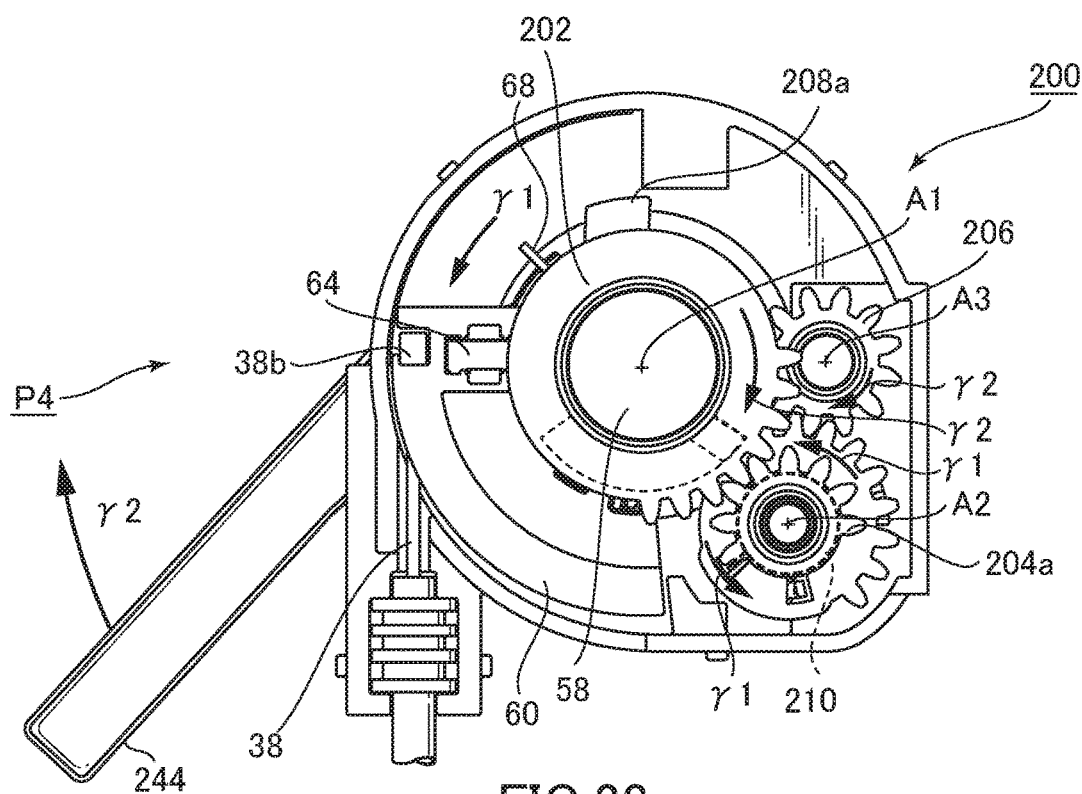
FIG. 22 is a side elevational view similar to FIGS. 18 and 20, showing the state in which, in the operating handle, drive unit, and operating wire for the operating device for the flush water tank assembly according to the third embodiment of the invention, the lock between the drive unit rotary member and rotary winding member is released, and only the rotary winding member is restored to a standby state.
Figure 23:
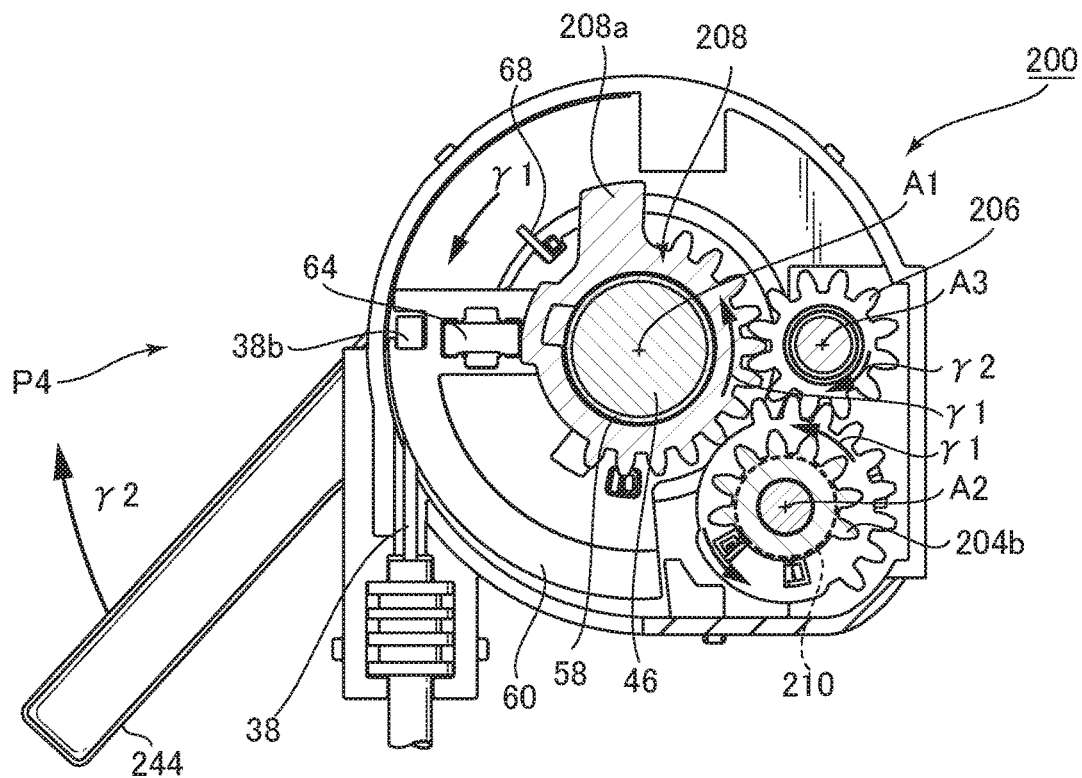
FIG. 23 is a cross sectional view similar to FIGS. 19 and 21, showing the state in which, in the operating handle, drive unit, and operating wire for the operating device for the flush water tank assembly according to the third embodiment of the invention, the lock between the drive unit rotary member and rotary winding member is released, and only the rotary winding member is restored to a standby state.

In addition, FIG. 22 is a side elevational view similar to FIGS. 18 and 20, showing the state in which, in the operating handle, drive unit, and operating wire for the operating device for the flush water tank according to the third embodiment of the invention, the lock between the drive unit rotary member and rotary winding member is released, and only the rotary winding member is restored to a standby state; FIG. 23 is a cross sectional view similar to FIGS. 19 and 21, showing the state in which, in the operating handle, drive unit, and operating wire for the operating device for the flush water tank assembly according to the third embodiment of the invention, the lock between the drive unit rotary member and rotary winding member is released, and only the rotary winding member is restored to a standby state.

Figure 24:
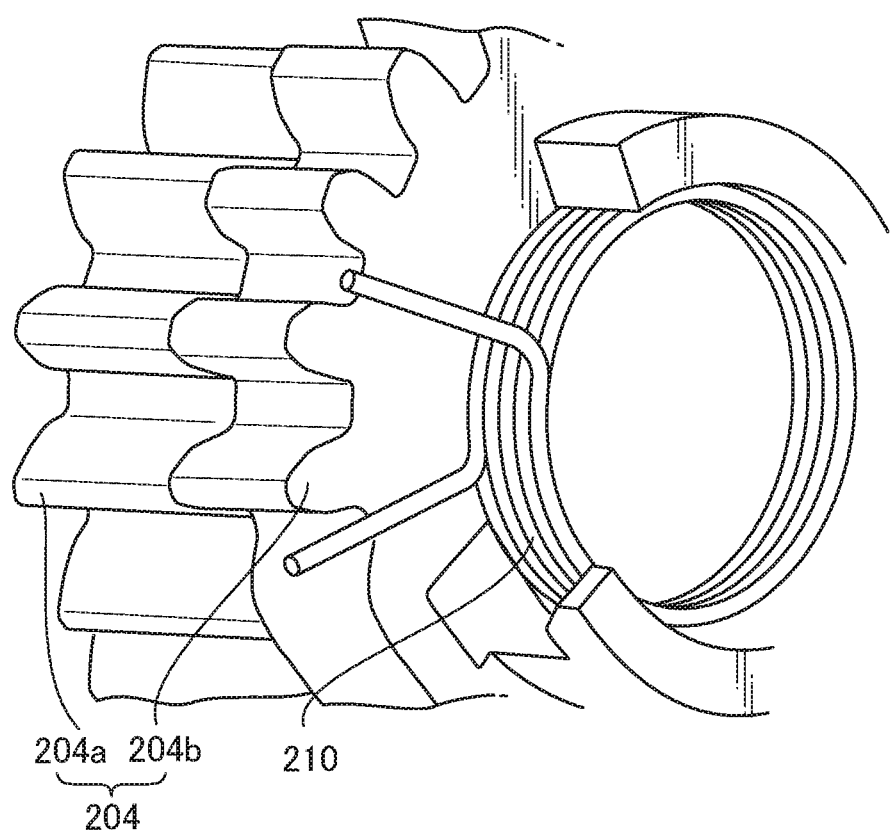
FIG. 24 is a simplified perspective view of a return spring seen from the axial direction outside (rear elevation side), installed into the second gear of a drive unit in the operating device for the flush water tank assembly according to the third embodiment of the present invention.

Also, FIG. 24 is a simplified perspective view of a return spring seen from the axial direction outside (rear elevation side), installed into the second gear of a drive unit in the operating device for the flush water tank assembly according to the third embodiment of the present invention.

Here, in the operating device 200 for the flush water tank assembly according to the third embodiment of the invention shown in FIGS. 16 through 24, the same reference numerals are used for the same parts of the operating device as the above-described first embodiment of the invention, and an explanation thereof is omitted.

First, as shown in FIGS. 16 through 24, in the operating device 200 for the flush water tank assembly according to the third embodiment of the invention, when the supply of flush water to the toilet is started, the operating handle 244 is a "push-type operating handle," whereby the operation to rotate in the valve opening direction (forward rotation direction γ1) so as to open the discharge valve main unit 36 is enabled by carrying out a rotary operation to press from operating position P1 (see FIGS. 18 and 19) to operating position P3 (see FIGS. 20 and 21); this point differs from the "pull-type operating handle" described above, in which the rotary operation is carried out by raising the operating handle 44 of the operating device 1 for the flush water tank assembly of the first embodiment of the invention.

In relation to these items, the operating device 200 for the flush water tank assembly according to the third embodiment of the invention differs in structure from the operating device 1 for the flush water tank assembly according to the above-described first embodiment of the invention on the point that the drive unit 240 comprises multiple gears inside a casing 250 (first gear 202, second gear 204, third gear 206, and hook gear 208) as a slave-side rotary member for following the rotation of the drive-side rotating member 58.

In addition, as shown in FIG. 16 and FIGS. 18-24, the operating device 200 for the flush water tank assembly according to the third embodiment of the invention differs from the above-described operating device 1 for the flush water tank assembly according to the first embodiment of the invention on the point that the drive unit 240 comprises a return spring 210 made up of a coil spring inside the casing 250 as a slave-side rotary member biasing portion for biasing the second gear 204 in a predetermined rotational direction, and the second gear 204, which is at a position other than the initial position (operating position P1) under the biasing force created by the momentum of this return spring 210, is constantly biased in a rotational direction restoring it to the initial position (operating position P1).

Similarly, as shown in FIG. 16, in the operating device 200 according to the third embodiment of the invention, a return spring 212 for constantly biasing the operating handle 244 in a rotational direction causing it to return to the initial position (operating position P1) is also provided close to the portion connecting the operating handle 244 and the rotary shaft 46 outside end portion 46a.

Note that in the operating device 200 according to the third embodiment of the invention a form is explained, in which a single return spring 210 is disposed on the second gear 204, as shown in FIG. 24, but return springs 210 may be placed on one of the gears 202, 206, 208 other than the second gear 204, or may be placed on each of the gears 202, 204, 206, and 208. In other words, it is sufficient for a single return spring 210 to be placed on at least one of these multiple gears 202, 204, 206, and 208.

In the present embodiment a form is explained, in which a return spring 210 was adopted as the slave-side rotary member biasing portion, but a spring element other than a twisted coil spring may also be adopted.

First, as shown in FIGS. 16 through 19, a hook gear 208 is attached so as to be slidable in the circumferential direction along the outside perimeter surface of the rotating member 58, between locking projecting portion 58a on the outside perimeter surface of the essentially cylindrical drive-side rotating member 58, and the rotary winding member 60.

Also, as shown in FIGS. 16, 18, and 19, a first gear 202 is disposed on the outer perimeter surface further to the tip side than the locking projecting portion 58a in the rotating member 58. A partial arc-shape is formed in the circumferential direction of a key channel 202a of predetermined width, on the inside perimeter portion of the surface on the side facing the hook gear 208 in the first gear 202. The locking projecting portion 58a is disposed to be able to rotatably slide about center axis line A1 when the rotating member 58 rotates about center axis line A1 inside this first gear 202.

Next, as shown in FIGS. 16, 18, and 19, a second gear 204 is attached so as to be rotatable about the center axis line A2 of the shaft portion 250a formed to extend in parallel in the axial direction to the rotary shaft 46 inside the casing 250.

This second gear 204 comprises a small gear 204a disposed within the same plane as the first gear 202 so as to be capable of meshing with the first gear 202 only, and a large gear 204b, integrally disposed on the base end of the shaft portion 250a relative to this small gear 204a, and capable of meshing with the third gear 206 only.

Also, as shown in Fig. as shown in FIGS. 16, 18, and 19, the third gear 200 is attached so as to be rotatable about center axis line A3 of the shaft portion 250b, which is formed to extend parallel to the axial direction of the shaft portion 250a and the rotary shaft 46 inside the water conduit member 25.

This third gear 206 is disposed within essentially the same plane as the second gear 204 and the hook gear 208 so as to be able to mesh with both 200 and 208.

In addition, as shown in FIGS. 18 and 19, a locking projecting portion 208a capable of contacting from below the locking projection 64, which projects outward from the locking projection attaching hole 60d on the rotary winding member 60, is formed on an outer perimeter portion of the hook gear 208.

Next, referring to FIGS. 16 through 23, the details of an operating device for a flush water tank assembly 200 according to a third embodiment of the invention are explained.

First, as shown in FIGS. 16 through 19, at operating position P1 in the standby state before starting the flush toilet operation (the discharge valve main unit 36 valve body 42 valve opening operation), the operating handle 244 disposed on the left side portion of the reservoir tank 14 as seen from the toilet front side is at rest in an attitude extending horizontally in the front-to-back direction from the base end portion thereof up to the tip portion, and the rotating member 58 locking projecting portion 58a is in a state of contact with one end portion of the key channel 202a in the circumferential direction (see FIG. 18).

When the toilet flushing operation (the discharge valve main unit 36 valve body 42 valve opening operation) is started, from operating position P1 (see FIGS. 18 and 19) to operating position P3 (see FIGS. 20 and 21), the operating handle 244 is operated to rotate in the forward rotation direction γ1 by a pressing operation pressing the operating handle 244 downward from above, which is a predetermined valve opening direction, about the center axis line A1, and the tip portion of the operating handle 244 is moved downward and to the rear. At this point the rotating member 58 rotates together with the operating handle 244 and the rotary shaft 46 as an integral piece, from operating position P1 (see FIGS. 18 and 19) to operating position P3 (see FIGS. 20 and 21) in a predetermined valve opening direction (forward rotation direction γ1), but since the state of contact by the rotating member 58 locking projecting portion 58a with one end portion in the circumferential direction of the first gear 202 key channel 202a is maintained, the first gear 202 may also rotate as an integral piece from operating position P1 (see FIGS. 18 and 19) to operating position P3 (see FIGS. 20 and 21) in a predetermined valve opening direction (forward rotation direction γ1) about center axis line A1.

At the same time, the second gear 204 small gear 204a, which meshes with the first gear 202, rotates in the opposite rotational direction (reverse rotation direction γ2) as forward rotation direction γ1, about center axis line A2, and the large gear 204b also rotates integrally with small gear 204a in the reverse rotation direction γ2 (see FIGS. 20 and 21).

The third gear 206, which meshes with the with second gear 204 large gear 204b, rotates in the forward rotation direction γ1 (see FIG. 21), which results in the hook gear 208, which meshes with the third gear 206, rotating in the reverse rotation direction γ2 (see FIG. 21).

At this point, as shown in FIGS. 19 and 21, a state is maintained relative to the hook gear 208 locking projecting portion 208a whereby the front end of that reverse rotation direction γ2 contacts the back end in the reverse rotation direction γ2 of the locking projection 64 projecting from the rotary winding member 60 locking attaching hole 60d, therefore the rotary winding member 60 also rotates integrally with the hook gear 208 in the reverse rotation direction γ2 (see FIGS. 21 and 22).

I.e., for the forward rotation direction γ1 of the operating handle 244 from operating position P1 to operating position P3, rotation is counterclockwise (left rotation) as seen in the plan view shown in FIGS. 20 and 21, but for the reverse rotation direction γ2 of the rotary winding member 60, rotation is clockwise (right rotation) as seen in the plan view shown in FIGS. 20 and 21, so the two rotational directions pertaining to the valve opening operation are in mutual opposition.

In addition, as in the operating device 1 according to the first embodiment of the invention described above and shown in FIG. 11, in the locking projection 64 tip portion 64 the sloped surface 64b at the front side in the forward rotation direction α contacts the sloped surface 50c on the under and rear side of the lock release projecting portion 50b when it reaches operating position P3 (see FIGS. 20 and 21), such that the locking projection 64 is pressed downward by the lock release projecting portion 50b.

Then, as in the operating device 1 according to the first embodiment of the invention described above and shown in FIG. 11, the locking projection 64 retracts from a projected state into the attaching hole 60d, the lock to the hook gear 208 locking projecting portion 208a is released, and the rotary winding member 60 moves in the forward rotation direction γ1 relative to the rotating member 58 due to the biasing force created by the momentum of the return spring 68, and returns to operating position P4 (see FIGS. 22 and 23).

I.e., as shown in FIGS. 22 and 23, with the lock between the rotary winding member 60 and the rotating member 58 in a released state, even if the operating handle 244 and the rotating member 58 operating position P4 are maintained at the same position as the operating handle 244 and rotating member 58 operating position P3 shown in FIGS. 20 and 21, only the rotary winding member 60 and the operating wire 38 can return to the standby state operating position P4, regardless of the operating positions of the operating handle 244, rotating member 58, and the like, so the discharge valve main unit 36 valve body 42 can descend to closed valve position H1 (see FIG. 2) along with the drop in the water level inside the reservoir tank 14, closing off the discharge port 18a.

In the operating device 200 for the flush water tank assembly at the operating position P4, shown in FIGS. 22 and 23, the second gear 204 is reliably returned to the initial position (the operating position P1 shown in FIGS. 18 and 19) at which the toilet flushing operation (the opening operation of the valve body 42 of the discharge valve main body 36) can begin.

Simultaneously the non-second gear 204 gears 202, 206, and 208 also follow the second gear 204, and are reliably returned to the initial position (the operating position P1 as shown in FIGS. 18 and 19) at which the flush toilet operation (the full opening operation of the valve body 42 of the discharge valve main body 36) can begin.

The operating handle 244 is also reliably returned by the biasing force resulting from the momentum of the return spring 212 to the initial position (the operating position P1 as shown in FIGS. 18 and 19) at which the toilet flushing operation (the full opening operation of the valve body 42 of the discharge valve main body 36) can begin.

The above places the operating device 200 for the flush water tank assembly in a standby state, able to start the next valve opening operation.

It is explained that a form of the operating device 200 for the flush water tank assembly according to the above-described third embodiment of the invention in which, for the slave-side rotary member which follows using the rotation of the rotating member 58, five gears (first gear 202, second gear 200 small gears 204a and 204b, third gear 206, and hook gear 208) are interposed between the rotating member 58 and the rotary winding member 60, but the number of slave-side rotary member gears may be a multiple number other than five, so long as the operating handle 244 can be moved from operating position P1 (see FIGS. 18 and 19) to operating position P3 (see FIGS. 20 and 21), so as to rotate in a predetermined valve opening direction (forward rotation direction γ1) while at the same time being rotating the rotary winding member 60 in a predetermined valve opening direction (reverse rotation direction γ2).

According to the operating device 200 for the flush water tank assembly according to the above-described third embodiment of the invention, by performing a rotary operation to press the operating handle 244 in the forward rotation direction γ1 when supply of flush water to the toilet is started, the rotating member 58 and first gear 202 rotate in a predetermined valve opening direction (forward rotation direction γ1), the second gear 204 rotates in a predetermined valve opening direction (reverse rotation direction γ2), the third gear 206 rotates in a predetermined valve opening direction (forward rotation direction γ1), and the hook gear 208 rotates in a predetermined valve opening direction (reverse rotation direction γ2).

At the same time, from operating position P1 to operating position P3 the rotary winding member 60 can rotate in a predetermined valve opening direction (reverse rotation direction γ2) opposite the drive-side rotating member 58 valve opening direction (forward rotation direction γ1).

Thereafter when the rotary winding member 60 reaches the second operating position it can, due to the release of the lock between the rotary member and the rotary winding member by the lock release portion, be rotated in a predetermined valve closing direction (forward rotation direction γ1) opposite a third predetermined valve opening direction, and can be moved to the first operating position P1.

I.e., when the toilet flushing operation (discharge valve main unit 36 valve body 42 valve opening operation) is started and the discharge valve main unit 36 temporarily moves to fully open position H3, at least the rotary winding member 60 and the operating wire 38 can move quickly to operating position P1, irrespective of the operating handle 244 operation, closing the discharge valve main unit 36, therefore toilet flushing can be accomplished with an amount of flush water supplied from the reservoir tank 14 to the toilet in each toilet flush controlled to a regulation amount.

Also, because the time from the start of the discharge valve main unit 36 valve body 42 opening operation to the valve closing operation thereof (the discharge valve main unit 36 opening time) can be shortened and the regulation flush water amount required for toilet flushing set relatively low, toilet flush water can be conserved.

In the operating device 200 for the flush water tank assembly according to the present embodiment, using a return spring 210, being a slave-side rotary member biasing portion of the drive unit 240, which applies a bias so that when the rotary winding member 60 has moved to operating position P1 after reaching operating position P3, multiple slave-side rotary members 2, being second gears 204, are returned from operating position P3 to the initial position (operating position P1) at which the toilet flushing operation (the discharge valve main unit 36 valve body 42 valve opening operation) can start; the toilet flushing operation (the discharge valve main unit 36 valve body 42 valve opening operation) is started, and the rotary winding member 60 rotates from operating position P1 in a predetermined valve opening direction (reverse rotation direction γ2) to operating position P3, after which, when the lock between the rotating member 58 and the rotary winding member 60 is released and the rotary winding member 60 and operating wire 38 have moved to operating position P1, at least one of the second gears 204 among the multiple gears 202, 204, 206, and 208 can, under the biasing force of the drive unit 240 return spring 210, and in preparation for the next toilet flushing operation, be quickly and reliably restored to the initial position (operating position P1) at which a toilet flushing operation (a discharge valve main unit 36 valve body 42 valve opening operation) can be started.

Note that in the operating device 1 according to the first embodiment, the operating device according to the second embodiment, and the operating device 200 according to the third embodiment of the above-described invention we described forms in which a locking projection 64 and biasing members 66 and 166 are respectively provided as locking units for locking the rotary winding members 60, 160 and the rotating member 58, and locking is effected between the locking projection 64 and the rotating member 58 locking projecting portion 58a, but it is also acceptable to provide a locking projection portion for locking on the rotary winding member 60, 160 side, and to provide a locking projection and biasing member on the rotating member 58, and it is sufficient for the locking unit to be provided on at least either the rotary member and the rotary winding member.

Also, in the operating devices according to the embodiments 1 through 3 of the above-described invention, forms are explained, in which a lock releasing projecting portion 50b is disposed on the drive unit 40 and a portion of the drive unit 240 casings 50 and 250 as a lock release portion for releasing the lock between the rotary winding member 60, 160 and the rotating member 58, but the invention is not limited thereto, and it is also acceptable to provide a separate lock release portion at a location other than the casings 50 and 250, or to erect a separate locking release portion on the rotating member 58 or the rotary winding member 60 and rotary winding member 160.

In addition, in the operating devices shown in the above-described first through third embodiments of the invention forms are explained, in which the operating handle 44 is disposed on the left side portion of the flush water tank assembly 2 reservoir tank 14 as seen from the front side of the toilet, but the invention is not limited thereto, and may also be of a form in which the operating handle 44 is disposed on the right side portion of the flush water tank assembly 2 reservoir tank 14 as seen from the front of the toilet.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An operating device for a flush water tank assembly, for operating a discharge valve of the flush water tank assembly to supply flush water to a toilet, the operating device comprising:
   a rotary shaft extending to penetrate a wall of a flush water tank of the flush water tank assembly;
   an operating member configured to rotate the rotary shaft by performing a rotating operation on the rotary shaft, the operating member being attached to an outside portion of the rotary shaft, the outside portion of the rotary shaft being positioned on an outside of the flush water tank;
   a linking member having a first end and a second end, the first end being linked to the discharge valve of the flush water tank assembly; and
   a drive unit attached to an inside portion of the rotary shaft and linked to the second end of the linking member, the drive unit being configured to move the second end of the linking member from a first operating position to a second operating position by the rotating operation of the operating member, the drive unit being positioned on the inside of the flush water tank and being attached to the rotary shaft, wherein the first operating position corresponds to a position at which the discharge valve is closed, and the second operating position corresponds to a position at which the discharge valve is open;
   wherein the drive unit includes:
      a rotary member affixed to the rotary shaft and integrally rotating with the rotary shaft;
      a rotary winding member to which the second end of the linking member is directly linked, wherein when the rotary shaft and the rotary member rotate by the rotating operation of the operating member so as to open the discharge valve, the rotary member engages with the rotary winding member, and the rotary winding member rotates to directly wind the linking member such that the second end of the linking member is moved from the first operating position to the second operating position;
      a locking unit disposed on the rotary winding member, the locking unit being configured to lock the rotary member and the rotary winding member by engaging with the rotary member such that the rotary member and the rotary winding member rotate from the first operating position to the second operating position by the rotating operation of the operating member;
      a lock release portion configured to release a locking member of the locking unit between the rotary member and the rotary winding member, wherein when the rotary member and the rotary winding member rotate such that the second end of the linking member moves to the second operating position, the locking unit between the rotary member and the rotary winding member is released, and the rotary winding member rotates in a valve closing direction in which the discharge valve is closed such that the rotary winding member and the second end of the linking member reach the first operating position; and
      a housing configured to house at least the rotary member and the rotary winding member.

2. The operating device according to claim 1, wherein the locking unit includes:
   a biasing member having one end that is attached to at least one of the rotary member and the rotary winding member, and
   the locking member disposed at other end of the biasing member, the locking member engaging with the rotary member and the rotary winding member due to a biasing force of the biasing member, thereby locking the rotary winding member and the rotary member when the rotary member and the rotary winding member rotate such that the linking member moves to the second operating position from the first operation position;
   wherein the lock release portion is disposed on the housing, and when the rotary winding member rotates such that the linking member moves to the second operating position from the first operating position, the locking member engages with the lock release portion of the housing so that the locking member between the rotary winding member and the rotary member can be released.

3. The operating device according to claim 2, wherein the biasing member has one end that is attached to the rotary winding member, and the locking member projects from the rotary winding member under the biasing force of the biasing member and engages with the rotary member until the linking member reaches the second operating position from the first operating position, and the locking member is attached to the other end of the biasing member such that the locking member can engage with the rotary member;
   wherein the locking unit further includes a locking projecting portion disposed to project from the rotary member, wherein the locking projecting portion of the rotary member engages with a portion of the locking member without engaging with the lock release portion of the housing until the linking member reaches the second operating position from the first operating position; and wherein in a state in which the linking member has reached the second operating position from the first operating position, the locking projecting portion of the rotary member, and the locking member engaging with the lock release portion of the housing are separated from one another.

4. The operating device according to claim 2, wherein the lock release portion is a lock releasing projecting portion placed inside the housing, and wherein the locking member has a sloped surface, the sloped surface engaging with the lock releasing projecting portion when the linking member has reached the second operating position from the first operating position.

5. The operating device according to claim 4, wherein the lock releasing projecting portion of the housing has a sloped surface, the sloped surface of the lock releasing projecting portion engaging with the sloped surface of the locking member when the linking member has reached to the second operating position.

6. The operating device according to claim 4, wherein the locking projecting portion of the rotary member has a sloped surface, the sloped surface being configured such that when the linking member has returned to the first operating position after the locking member between the rotary member and the rotary winding member has been released when the linking member has reached the second operating position, the sloped surface of the locking member being able to pass over the sloped surface on the locking projecting portion of the rotary member.

7. The operating device according to claim 1, wherein the drive unit further includes a rotary winding member biasing portion for biasing the rotary winding member such that the linking member moves to the first operating position after the linking member has reached the second operating position.

8. The operating device according to claim 1, wherein the operating member is disposed on a left side of the flush water tank or a right side of the flush water tank, and when supply of flush water to the toilet is started, the rotary member and the rotary winding member are rotated from the first operating position to the second operating position by the rotating and lifting up operation of the operating member from the first operating position to the second operating position such that the second end of the linking member is lifted up in a valve opening direction to open up the discharge valve, wherein the rotary member and the rotary winding member can, by the rotating and lifting up operation of the operating member from the first operating position to the second operating position, be rotated in the same valve opening direction with each other such that the second end of the linking member moves from the first operating position to the second operating position; and wherein when the rotary member and the rotary winding member have rotated such that the second end of the linking member reaches the second operating position, the locking by the locking unit between the rotary member and the rotary winding member is released by the lock release portion such that the rotary winding member is rotated in the valve closing direction and the second end of the linking member is moved to the first operating position.

9. The operating device according to claim 1, wherein the rotary member of the drive unit includes a drive-side rotary member affixed to the rotary shaft, and a slave-side rotary member interposed between the drive-side rotary member and the rotary winding member;

wherein the operating member is disposed on left side of the flush water tank or right side of the flush water tank, and pressing downward an operating handle of the operating member enables the operating member to rotate in a direction in which the discharge valve is opened such that the linking member moves from the first operating position to the second operating position, thereby supplying flush water to the toilet;

wherein a rotary operation of the operating member in the valve opening direction enables the drive-side rotary member and the slave-side rotary member to rotate in a first predetermined direction and a second predetermined direction, respectively such that the linking member moves from the first operating position to the second operating position;

wherein the rotary operation of the operating member in the valve opening direction enables the rotary winding member to rotate in a third predetermined direction opposite the first predetermined direction of the drive-side rotary member; and wherein, when the rotary operation of the operating member in the valve opening direction enables the rotary winding member to rotate such that the linking member reaches the second operating position, the rotary winding member can, by releasing the locking member between the rotary member and the rotary winding member using the lock release portion, rotate in a predetermined direction opposite the third predetermined direction such that the linking member moves to the first operating position.

10. The operating device according to claim 9, wherein the slave-side rotary member consists of multiple slave-side rotary members, and wherein the drive unit further includes a biasing member for biasing the slave-side rotary members, and after the rotary winding member has rotated such that the linking member has reached the second operating position, the biasing member biases at least one of the multiple slave-side rotary members, the at least one of the multiple slave-side rotary members enabling the operating handle of the operating member to move from a position which corresponds to the second operating position to an initial position at which the discharge valve opening operation can be started.

11. A flush water tank assembly comprising the operating device according to claim 1.

12. A flush toilet comprising the flush water tank assembly according to claim 11.

* * * * *